US010846910B2

(12) United States Patent
Mason

(10) Patent No.: US 10,846,910 B2
(45) Date of Patent: Nov. 24, 2020

(54) METHOD AND APPARATUS FOR SPLITTING THREE-DIMENSIONAL VOLUMES

(71) Applicant: Electronic Arts Inc., Redwood City, CA (US)

(72) Inventor: Ashton Mason, Twickenham (GB)

(73) Assignee: ELECTRONIC ARTS INC., Redwood City, CA (US)

( * ) Notice: Subject to any disclaimer, the term of this patent is extended or adjusted under 35 U.S.C. 154(b) by 0 days.

(21) Appl. No.: 16/380,535

(22) Filed: Apr. 10, 2019

(65) Prior Publication Data

US 2020/0327719 A1 Oct. 15, 2020

(51) Int. Cl.
  *G06T 15/08* (2011.01)
  *G06T 17/20* (2006.01)
  *G06T 15/30* (2011.01)

(52) U.S. Cl.
  CPC .............. *G06T 15/08* (2013.01); *G06T 15/30* (2013.01); *G06T 17/205* (2013.01)

(58) Field of Classification Search
  None
  See application file for complete search history.

(56) References Cited

U.S. PATENT DOCUMENTS 9,305,396 B2  4/2016 Mason
2015/0015577 A1* 1/2015 Mason .................... G06T 17/30
                                              345/420

OTHER PUBLICATIONS

Lien, Jyh-Ming, and Nancy M. Amato. "Approximate convex decomposition of polyhedra." Proceedings of the 2007 ACM symposium on Solid and physical modeling. 2007. (Year: 2007).*
Mammou, Khaled, The V-HACD library decomposes a 3D surface into a set of "near" convex parts, GitHub, Mar. 11, 2018, Retrieved from https://github.com/kmammou/v-hacd.

* cited by examiner

*Primary Examiner* — Vu Nguyen
(74) *Attorney, Agent, or Firm* — Middleton Reutlinger

(57) ABSTRACT

Apparatuses and methods pertaining to computer handling of three dimensional volumes are disclosed. One such method comprises obtaining data representing an input set of one or more three-dimensional volumes; selecting a first three-dimensional volume from among the input set of three-dimensional volumes; identifying a concavity in the first three-dimensional volume, the concavity having a region of deepest concavity; splitting the first three-dimensional volume along a split plane or intersection loop contacting or intersecting the region of deepest concavity, such as to provide plural three-dimensional volumes; and providing data representing an output set of two or more three-dimensional volumes.

20 Claims, 24 Drawing Sheets

METHOD AND APPARATUS FOR SPLITTING THREE-DIMENSIONAL VOLUMES

FIELD

This specification relates to methods, systems and computer programs for computer handling of three dimensional volumes.

BACKGROUND

Computer representations of three-dimensional volumes are useful in many fields, such as augmented/virtual reality, computer-aided manufacturing, computer games, and civil engineering design. Typically, these computer representations are created by artists or generated from images, and describe the volumes' visual shape and appearance.

It may be desirable to decompose input three-dimensional volumes into a small number of convex or roughly-convex volumes, which together approximate the input volumes. In particular, this kind of decomposition may allow a physics simulation such as collision detection to be performed in an efficient way. Performing collision detection directly on three-dimensional volumes as created by artists or generated from images can prove computationally costly and prone to error, because the volumes are typically complex and may have concavities which may make it difficult to determine whether a point is inside or outside a volume. By decomposing volumes into a small number of simpler convex or roughly-convex volumes, the speed and accuracy of computerized collision detection can be substantially increased. Ensuring that the resulting volumes are few and simple enough is of vital importance given that in typical real-time applications, the physics simulation of an entire three-dimensional scene may need to be performed in only a few milliseconds.

However, the usefulness of such an approximate decomposition is highly dependent on its degree of fidelity to the original volumes. Indeed, if the resulting convex or roughly-convex volumes do not approximate the original volumes closely enough, running physics simulations on the convex or roughly-convex volumes may poorly model the behavior of the original volumes. Moreover, the process of finding a simple and accurate decomposition of the input three-dimensional volumes needs to be efficient enough to complete in a reasonable time when running on modern hardware, which is a significant challenge considering the computational complexity of operations on computer representations of three-dimensional volumes and the typically extremely large search space of possible decompositions.

Thus, there is an ongoing challenge in approximately decomposing three-dimensional volumes into a small number of simpler convex or roughly-convex volumes which preserve the geometry of the original volume to a high degree of fidelity, at reasonable computational cost.

SUMMARY

A first aspect of this specification provides a method, performed by one or more processors, the method comprising:
obtaining data representing an input set of one or more three-dimensional volumes;
selecting a first three-dimensional volume from among the input set of three-dimensional volumes;
identifying a concavity in the first three-dimensional volume, the concavity having a region of deepest concavity;
splitting the first three-dimensional volume along a split plane or intersection loop contacting or intersecting the region of deepest concavity, such as to provide plural three-dimensional volumes; and
providing data representing an output set of two or more three-dimensional volumes.

The method may comprise:
identifying points which are outside or on a surface of the one or more three-dimensional volumes;
calculating a depth value for each of multiple points which was determined to lie outside or on the surface of the one or more three-dimensional volumes, the depth value for a point indicating a depth of the point within an approximating convex volume; and
using the depth values to identify the region of deepest concavity in the first three-dimensional volume.

The method may comprise:
identifying one or more faces and/or edges of the first three-dimensional volume that is or are coincident with or adjacent to the deepest concavity; and
forming one or more candidate splitting planes or candidate splitting intersection loops from at least one of the identified faces and edges.

This method may comprise scoring each of multiple candidate splitting planes or candidate splitting intersection loops and selecting as the splitting plane or the splitting intersection loop a candidate splitting plane or candidate splitting intersection loop that has a best score. This method may comprise scoring each of multiple candidate splitting planes or candidate splitting intersection loops by summing volumes of convex hulls of volumes that are produced by splitting the first three-dimensional volume along the candidate splitting plane or candidate splitting intersection loop.

The method may comprise: calculating an overhang metric which indicates the non-convexity of the first volume, and selecting, using the overhang metric, the first three-dimensional volume from among the input set of three-dimensional volumes. This method may comprise selecting the first three-dimensional volume by selecting the three-dimensional volume from among the input set of three-dimensional volumes for which a greatest magnitude overhang metric value was calculated. In either case, the method may comprise calculating the overhang metric comprises calculating a maximum distance by which an approximating convex volume of the first three-dimensional volume extends from the first three-dimensional volume.

Alternatively, the method may comprise voxelizing the input set of one or more three-dimensional volumes such as to provide a voxel representation of the input set of volumes, and wherein calculating the overhang metric comprises:
identifying voxels of the voxel representation of the input set of volumes which are outside the one or more three-dimensional volumes and within an approximating convex volume of the first three-dimensional volume;
for each voxel which was determined to lie outside the one or more three-dimensional volumes and within the approximating convex volume of the first three-dimensional volume:
calculating a minimum distance from the voxel to a surface of the approximating convex volume, and
calculating a minimum distance from the voxel to a surface of the first three-dimensional volume, summing the two distances to obtain a generalized overhang metric for the voxel, and identifying the highest magnitude generalized overhang metric.

The method may comprise: voxelizing the input set of one or more three-dimensional volumes such as to provide a voxel representation of the input set of volumes, and using the voxel representation to identify the deepest concavity in the first three-dimensional volume.

The method may comprise: merging two or more three-dimensional volumes such as to provide a merged three-dimensional volume. This method may comprise: providing the merged three-dimensional volume in the output set of two or more three-dimensional volumes. This method may comprise: providing the merged three-dimensional volume in an intermediate set of three or more three-dimensional volumes; merging two or more three-dimensional volumes of the intermediate set of three-dimensional volumes to provide a merged three-dimensional volume; and providing the merged three-dimensional volume in the output set of two or more three-dimensional volumes.

The method may comprise: iteratively splitting three-dimensional volumes to provide an intermediate set of three or more three-dimensional volumes, and then iteratively merging volumes of the intermediate set of three or more three-dimensional volumes to provide the output set of two or more three-dimensional volumes.

The data representing an input set of one or more three-dimensional volumes and the data representing an output set of two or more three-dimensional volumes may be mesh data.

A second aspect of the specification provides a method, performed by one or more processors, comprising:

obtaining data representing an input set of three or more three-dimensional volumes;

constructing plural candidate sets of three-dimensional volumes, each candidate set comprising two or more three-dimensional volumes of the input set;

for each candidate set, calculating an overhang metric which indicates the non-convexity of a volume that would be obtained if the volumes of the candidate set were merged;

selecting the candidate set for which a least magnitude overhang metric value was calculated;

merging the volumes of the selected candidate set to produce a merged volume; and replacing the volumes of the selected candidate set with the merged volume.

The method may comprise: merging the volumes of the selected candidate set by providing as the merged volume an approximating convex volume of the volume formed by the union of the volumes of the selected candidate set.

The method may comprise: merging the volumes of the selected candidate set by providing as the merged volume the union of the volumes of the selected candidate set.

The method may comprise: calculating the overhang metric comprises calculating a maximum distance by which an approximating convex volume of the volume that would be obtained if the volumes of the candidate set were merged extends from the volume that would be obtained if the volumes of the candidate set were merged.

Another aspect of the specification provides apparatus comprising one or more processors and a memory, the memory comprising instructions that, when executed by the one or more processors, cause the apparatus to perform a method as recited above.

A further aspect of the specification provides a computer program comprising machine-readable instructions that, when executed by a processing device, cause the processing device to perform a method as recited above.

Another aspect of the specification provides a non-transitory computer readable storage medium having instructions that, when executed by a processing device, cause the processing device to perform a method as recited above.

A further aspect of the specification provides a non-transitory computer readable storage medium having instructions that, when executed by a processing device, cause the processing device to perform operations comprising:

obtaining data representing an input set of one or more three-dimensional volumes;

selecting a first three-dimensional volume from among the input set of three-dimensional volumes;

identifying a concavity in the first three-dimensional volume, the concavity having a region of deepest concavity;

splitting the first three-dimensional volume along a split plane or intersection loop contacting or intersecting the region of deepest concavity, such as to provide plural three-dimensional volumes; and providing data representing an output set of two or more three-dimensional volumes.

The instructions may cause the processing device to perform:

identifying points which are outside or on a surface of the one or more three-dimensional volumes;

calculating a depth value for each of multiple points which was determined to lie outside or on the surface of the one or more three-dimensional volumes, the depth value for a point indicating a depth of the point within an approximating convex volume; and using the depth values to identify the region of deepest concavity in the first three-dimensional volume.

The instructions may cause the processing device to perform:

identifying one or more faces and/or edges of the first three-dimensional volume that is or are coincident with or adjacent to the deepest concavity; and forming one or more candidate splitting planes or candidate splitting intersection loops from at least one of the identified faces and edges.

The instructions may cause the processing device to perform scoring each of multiple candidate splitting planes or candidate splitting intersection loops and selecting as the splitting plane or the splitting intersection loop a candidate splitting plane or candidate splitting intersection loop that has a best score. The instructions may cause the processing device to perform scoring each of multiple candidate splitting planes or candidate splitting intersection loops by summing volumes of convex hulls of volumes that are produced by splitting the first three-dimensional volume along the candidate splitting plane or candidate splitting intersection loop.

The instructions may cause the processing device to perform: calculating an overhang metric which indicates the non-convexity of the first volume, and selecting, using the overhang metric, the first three-dimensional volume from among the input set of three-dimensional volumes. The instructions may cause the processing device to perform selecting the first three-dimensional volume by selecting the three-dimensional volume from among the input set of three-dimensional volumes for which a greatest magnitude overhang metric value was calculated. In either case, the instructions may cause the processing device to perform calculating the overhang metric comprises calculating a maximum distance by which an approximating convex volume of the first three-dimensional volume extends from the first three-dimensional volume.

Alternatively, the instructions may cause the processing device to perform voxelizing the input set of one or more three-dimensional volumes such as to provide a voxel representation of the input set of volumes, and wherein calculating the overhang metric comprises:

identifying voxels of the voxel representation of the input set of volumes which are outside the one or more three-dimensional volumes and within an approximating convex volume of the first three-dimensional volume;

for each voxel which was determined to lie outside the one or more three-dimensional volumes and within the approximating convex volume of the first three-dimensional volume:

calculating a minimum distance from the voxel to a surface of the approximating convex volume, and calculating a minimum distance from the voxel to a surface of the first three-dimensional volume, summing the two distances to obtain a generalized overhang metric for the voxel, and identifying the highest magnitude generalized overhang metric.

The instructions may cause the processing device to perform: voxelizing the input set of one or more three-dimensional volumes such as to provide a voxel representation of the input set of volumes, and using the voxel representation to identify the deepest concavity in the first three-dimensional volume.

The instructions may cause the processing device to perform: merging two or more three-dimensional volumes such as to provide a merged three-dimensional volume.

The instructions may cause the processing device to perform: providing the merged three-dimensional volume in the output set of two or more three-dimensional volumes. The instructions may cause the processing device to perform: providing the merged three-dimensional volume in an intermediate set of three or more three-dimensional volumes; merging two or more three-dimensional volumes of the intermediate set of three-dimensional volumes to provide a merged three-dimensional volume; and providing the merged three-dimensional volume in the output set of two or more three-dimensional volumes.

The instructions may cause the processing device to perform: iteratively splitting three-dimensional volumes to provide an intermediate set of three or more three-dimensional volumes, and then iteratively merging volumes of the intermediate set of three or more three-dimensional volumes to provide the output set of two or more three-dimensional volumes.

The data representing an input set of one or more three-dimensional volumes and the data representing an output set of two or more three-dimensional volumes may be mesh data.

A second aspect of the specification provides a non-transitory computer readable storage medium having instructions that, when executed by a processing device, cause the processing device to perform operations comprising:

obtaining data representing an input set of three or more three-dimensional volumes;

constructing plural candidate sets of three-dimensional volumes, each candidate set comprising two or more three-dimensional volumes of the input set;

for each candidate set, calculating an overhang metric which indicates the non-convexity of a volume that would be obtained if the volumes of the candidate set were merged;

selecting the candidate set for which a least magnitude overhang metric value was calculated;

merging the volumes of the selected candidate set to produce a merged volume; and replacing the volumes of the selected candidate set with the merged volume.

The instructions may cause the processing device to perform: merging the volumes of the selected candidate set by providing as the merged volume an approximating convex volume of the volume formed by the union of the volumes of the selected candidate set.

The instructions may cause the processing device to perform: merging the volumes of the selected candidate set by providing as the merged volume the union of the volumes of the selected candidate set.

The instructions may cause the processing device to perform: calculating the overhang metric comprises calculating a maximum distance by which an approximating convex volume of the volume that would be obtained if the volumes of the candidate set were merged extends from the volume that would be obtained if the volumes of the candidate set were merged.

A further aspect of the specification provides apparatus comprising one or more processors and a memory, the memory comprising instructions that, when executed by the one or more processors, cause the one or more processors to perform:

obtaining data representing an input set of one or more three-dimensional volumes;

selecting a first three-dimensional volume from among the input set of three-dimensional volumes;

identifying a concavity in the first three-dimensional volume, the concavity having a region of deepest concavity;

splitting the first three-dimensional volume along a split plane or intersection loop contacting or intersecting the region of deepest concavity, such as to provide plural three-dimensional volumes; and providing data representing an output set of two or more three-dimensional volumes.

The instructions may cause the one or more processors to perform:

identifying points which are outside or on a surface of the one or more three-dimensional volumes;

calculating a depth value for each of multiple points which was determined to lie outside or on the surface of the one or more three-dimensional volumes, the depth value for a point indicating a depth of the point within an approximating convex volume; and using the depth values to identify the region of deepest concavity in the first three-dimensional volume.

The instructions may cause the one or more processors to perform:

identifying one or more faces and/or edges of the first three-dimensional volume that is or are coincident with or adjacent to the deepest concavity; and forming one or more candidate splitting planes or candidate splitting intersection loops from at least one of the identified faces and edges.

The instructions may cause the one or more processors to perform scoring each of multiple candidate splitting planes or candidate splitting intersection loops and selecting as the splitting plane or the splitting intersection loop a candidate splitting plane or candidate splitting intersection loop that has a best score. The instructions may cause the one or more processors to perform scoring each of multiple candidate splitting planes or candidate splitting intersection loops by summing volumes of convex hulls of volumes that are produced by splitting the first three-dimensional volume along the candidate splitting plane or candidate splitting intersection loop.

The instructions may cause the one or more processors to perform: calculating an overhang metric which indicates the non-convexity of the first volume, and selecting, using the overhang metric, the first three-dimensional volume from among the input set of three-dimensional volumes. The instructions may cause the one or more processors to perform selecting the first three-dimensional volume by selecting the three-dimensional volume from among the input set of three-dimensional volumes for which a greatest magnitude overhang metric value was calculated. In either case, the instructions may cause the one or more processors to perform calculating the overhang metric comprises calculating a maximum distance by which an approximating convex volume of the first three-dimensional volume extends from the first three-dimensional volume.

Alternatively, the instructions may cause the one or more processors to perform voxelizing the input set of one or more three-dimensional volumes such as to provide a voxel representation of the input set of volumes, and wherein calculating the overhang metric comprises:

identifying voxels of the voxel representation of the input set of volumes which are outside the one or more three-dimensional volumes and within an approximating convex volume of the first three-dimensional volume;

for each voxel which was determined to lie outside the one or more three-dimensional volumes and within the approximating convex volume of the first three-dimensional volume:

calculating a minimum distance from the voxel to a surface of the approximating convex volume, and calculating a minimum distance from the voxel to a surface of the first three-dimensional volume, summing the two distances to obtain a generalized overhang metric for the voxel, and identifying the highest magnitude generalized overhang metric.

The instructions may cause the one or more processors to perform: voxelizing the input set of one or more three-dimensional volumes such as to provide a voxel representation of the input set of volumes, and using the voxel representation to identify the deepest concavity in the first three-dimensional volume.

The instructions may cause the one or more processors to perform: merging two or more three-dimensional volumes such as to provide a merged three-dimensional volume. The instructions may cause the one or more processors to perform: providing the merged three-dimensional volume in the output set of two or more three-dimensional volumes. The instructions may cause the one or more processors to perform: providing the merged three-dimensional volume in an intermediate set of three or more three-dimensional volumes; merging two or more three-dimensional volumes of the intermediate set of three-dimensional volumes to provide a merged three-dimensional volume; and providing the merged three-dimensional volume in the output set of two or more three-dimensional volumes.

The instructions may cause the one or more processors to perform: iteratively splitting three-dimensional volumes to provide an intermediate set of three or more three-dimensional volumes, and then iteratively merging volumes of the intermediate set of three or more three-dimensional volumes to provide the output set of two or more three-dimensional volumes.

The data representing an input set of one or more three-dimensional volumes and the data representing an output set of two or more three-dimensional volumes may be mesh data.

A further aspect of the specification provides apparatus comprising one or more processors and a memory, the memory comprising instructions that, when executed by the one or more processors, cause the one or more processors to perform:

obtaining data representing an input set of three or more three-dimensional volumes;

constructing plural candidate sets of three-dimensional volumes, each candidate set comprising two or more three-dimensional volumes of the input set;

for each candidate set, calculating an overhang metric which indicates the non-convexity of a volume that would be obtained if the volumes of the candidate set were merged;

selecting the candidate set for which a least magnitude overhang metric value was calculated;

merging the volumes of the selected candidate set to produce a merged volume; and replacing the volumes of the selected candidate set with the merged volume.

The instructions may cause the one or more processors to perform: merging the volumes of the selected candidate set by providing as the merged volume an approximating convex volume of the volume formed by the union of the volumes of the selected candidate set.

The instructions may cause the one or more processors to perform: merging the volumes of the selected candidate set by providing as the merged volume the union of the volumes of the selected candidate set.

The instructions may cause the one or more processors to perform: calculating the overhang metric comprises calculating a maximum distance by which an approximating convex volume of the volume that would be obtained if the volumes of the candidate set were merged extends from the volume that would be obtained if the volumes of the candidate set were merged.

DETAILED DESCRIPTION

Figure 1:
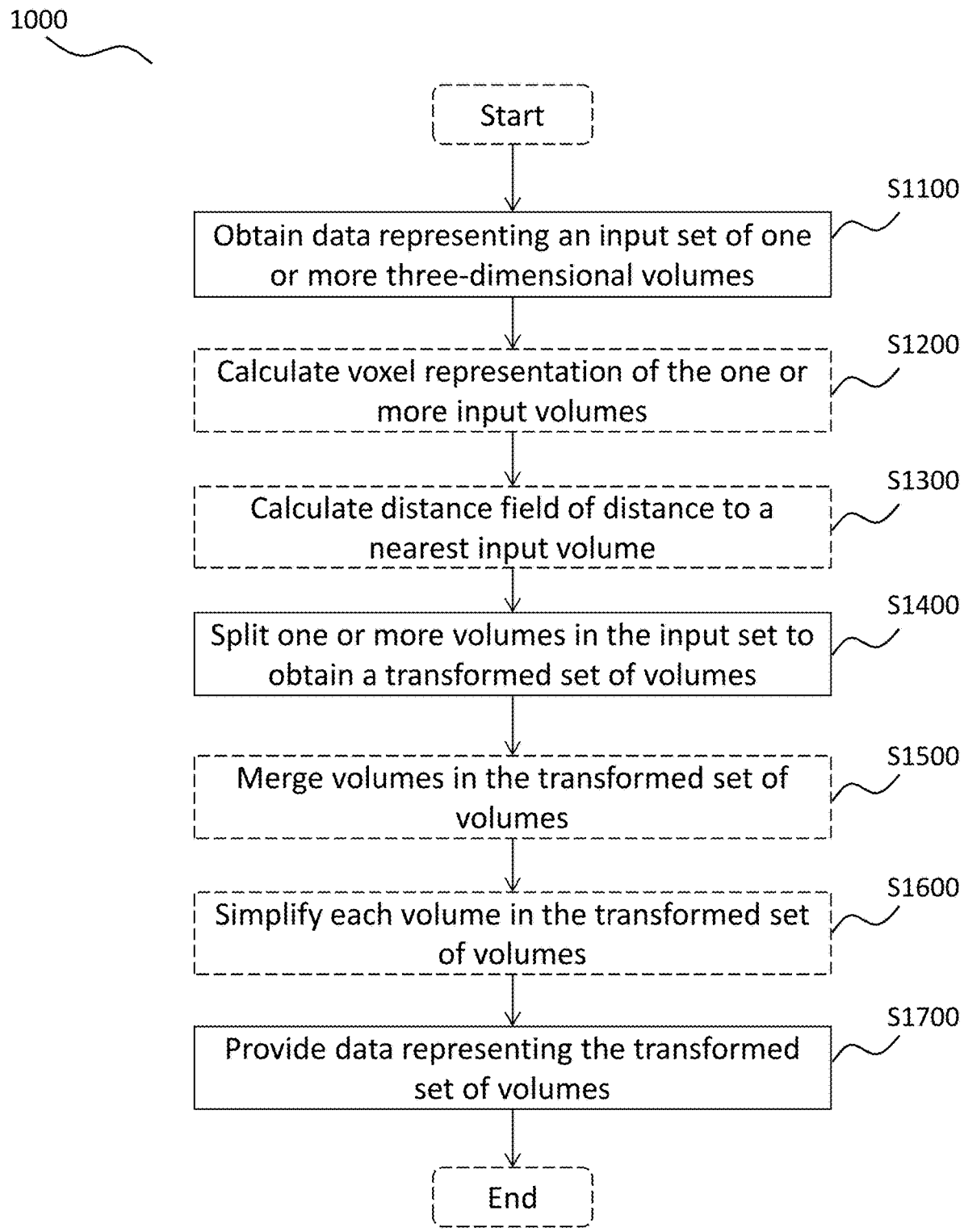
FIG. 1 shows a method for decomposing one or more three-dimensional volumes into convex or roughly-convex volumes according to embodiments of the present specification.

The present disclosure provides a method for decomposing one or more three-dimensional volumes into convex or roughly-convex volumes. The disclosure also provides a computer program and computer apparatus that implement the method.

The method accepts as input a set of one or more volumes defined by computer-readable data, such as one or more polygon meshes which define a boundary of the one or more volumes. The set of one or more input volumes need not be convex and typically are not convex.

The method outputs a set of volumes. Like the input volumes, these are defined by computer-readable data, such as one or more polygon meshes which represent their boundaries. In particular, the method may output convex volumes represented by meshes which are always strictly two-manifold, closed and convex. Alternatively, the method may be configured to output roughly-convex volumes, that is, volumes which are not strictly convex but convex up to a tolerance. In both cases, each output volume can be thought of as a convex or roughly-convex approximation of a respective part of the input volumes. Between the input set of volumes and the output set of volumes, there may be one or multiple intermediate sets of volumes.

Because the method takes a set of volumes as input, and produces a set of volumes as output, a set of volumes is used as an internal representation. In this respect, the method can be seen as a pipeline of operations on a set of volumes. At any point in the pipeline, the transformed set of volumes constitutes a viable, if non-optimal, intermediate set of volumes, which may or may not be provided as an output set. In the method, a volume at any stage of the method may defined by a mesh. Each volume may have associated with it a convex hull mesh that is its current convex approximation.

The method acts on the input set of one or more volumes in a splitting stage, optionally followed by merging and simplification stages.

In the splitting stage, volumes which are not convex are split until all volumes are convex to within a user-specified tolerance. Individual volumes are split with well-chosen splitting planes or intersection loops in order to break them apart into child volumes. When a volume is split with a plane, the mesh that defines it is split, resulting in two mesh segments, one inside the plane and the other outside. The mesh segments then define two or more child volumes. Similarly, splitting a volume represented by a mesh at an intersection loop may involve cutting any face of the volume which the loop intersects into two separate faces, and generating child volumes from the faces and edges on either side of the intersection loop, resulting in two separate meshes each defining a child volume. The splitting stage produces child volumes that are closer to being convex. The child volumes have defined locations and orientations such that the combination of the child volumes is the same as the original volume from which the child volumes were derived.

The method may provide several advantages in the mechanisms by which volumes are split. In particular, volumes may be prioritized for splitting using an overhang metric which indicates the non-convexity (concavity) of a volume by measuring the deviation of its convex hull from the input volume, which effectively prioritizes the splitting of volumes that are poorly approximated by their hulls. Furthermore, after determining a volume to split, a method (which advantageously is voxel-based) may be used to find the deepest concavities of the volume, which provides locations of splitting planes or splitting intersection loops likely to optimally decompose concave volumes into convex volumes. In addition, promising candidate split planes and/or intersection loops may advantageously be identified by constructing sequences of edges which seek and follow concavities in the volume to split, based on an analysis of the local geometry of the mesh in the vicinity of the sequence.

The method may then simply output the volumes obtained at the end of the splitting stage. Alternatively, in order to reduce the number of volumes and reduce their complexity, the method may continue to process the volumes in a merging stage and/or a simplification stage.

In the merging stage, pairs of volumes obtained at the end of the splitting stage are merged until the total number of volumes in the set is within a user-specified limit. In each merge, two different volumes (having respective locations and orientations) are merged into a single combined volume. Candidate pairs may be prioritized for merging using a measure of concavity. Advantageously, the measure of concavity is the same overhang metric used to prioritize splitting, effectively favoring merges that produce merged volumes whose convex hulls approximate the input volumes as closely as possible. In some embodiments, the merging stage may be configured to output volumes which are convex. To this end, at the start of the merging stage, the volumes obtained at the end of the splitting stage may be convexified, and each merging of a pair may output a convex volume which comprises the two volumes of the pair. In other embodiments, the merging stage may be configured to output volumes which are roughly-convex although not necessarily strictly convex. Also, three or more volumes may be merged in a single step.

In the simplification stage, the complexity of individual volumes may be reduced to meet user-specified limits on the complexity of volumes. The simplified versions of the volumes may be output by the method.

At first glance, the splitting and merging stages might seem to be in opposition: one splits volumes, the other merges them. However, combining those two stages enables optimal handling of cases where the input volume comprises both many sub-volumes and some very complex individual sub-volumes. In these cases, it may be beneficial to split some complex volumes to break them up into large concave pieces, but then to merge these pieces with smaller detail volumes in order to reduce the total number of volumes.

Furthermore, because the splitting planes and intersection loops may be chosen according to heuristic criteria rather than by exhaustive search in order for the splitting stage to be computationally efficient, each split may perform a decomposition of a volume into volumes that are less concave in a close to optimal though not perfectly optimal way. Consequently, continuing to split a volume when the number of resulting volumes exceeds a desired number of volumes and then merging volumes back together may yield a more accurate output decomposition than an alternative scheme that includes stopping the splitting stage when the desired number of volumes is reached and not performing the merging stage.

Representing volumes as meshes may allow for a particularly accurate and efficient decomposition of the input volumes, though other ways of defining volumes may alternatively be used. For example, volumes may be defined directly as convex hulls and split by clipping the convex hulls with planes. However, using such a representation may cause slower computations, because when a volume is split, the convex hulls of the split parts may need to be recomputed. In another example, volumes may be defined by sets of voxels and split by splitting sets of voxels into pairs of smaller sets. However, using such a representation, the output hulls may not reflect the shape of the original mesh as accurately, because hulls built around sets of voxels can tend to be irregular.

The operation of the method is now described in more detail with reference to FIG. 1, which shows an example method 1000 for decomposing one or more three-dimensional volumes into convex or roughly-convex volumes.

At step S1100, data representing an input set of one or more three-dimensional volumes is obtained. The three-dimensional volumes need not be convex, and typically are concave.

The data may represent the input set of one or more three-dimensional volumes in the form of one or more polygon meshes. A polygon mesh is a collection of vertices, edges and faces that define the shape and/or boundary of a three-dimensional volume. The faces may consist of various polygonal shapes such as triangles, quadrilaterals, convex polygons or concave polygons, and may be planar or non-planar. If the polygon mesh comprises non-triangular faces (e.g. quadrilateral faces) or non-planar faces, these may optionally be triangulated.

In some cases, the data may be a single mesh describing a single volume.

Figure 2:
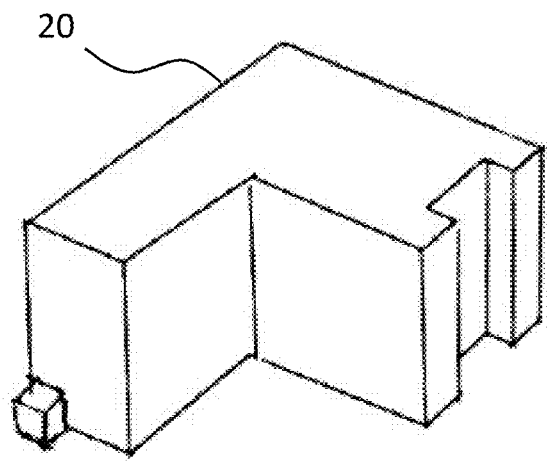
FIG. 2 depicts a polygon mesh representing an example three-dimensional volume.

FIG. 2, for example, depicts an example computer representation of an example three-dimensional volume 20. The computer representation is a polygon mesh, which defines a surface and a volume inside the surface. The example three-dimensional volume is concave.

In other cases, the data may represent compound volumes built out of multiple parts. For example, the data may be a plurality of disconnected meshes each describing a separate volume, where some of the separate volumes may together form compound volumes.

Figure 3:
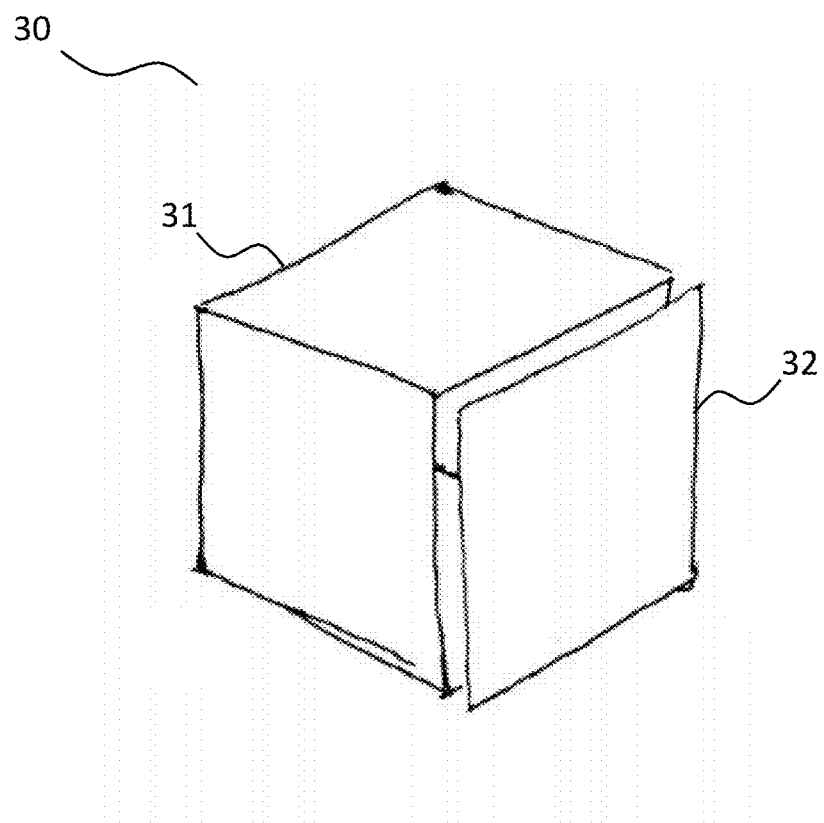
FIG. 3 depicts two polygon meshes representing another example three-dimensional volume.

More typically, the data may be a plurality of disconnected meshes which collectively describe one or more volumes, even though some of the meshes do not describe one or more volumes on their own. FIG. 3, for example, depicts a computer representation of another example three-dimensional volume 30, comprising two disconnected meshes labelled 31 and 32. Although meshes 31 and 32 may meet geometrically along their boundaries, they are not topologically connected and so do not strictly bound a volume. Nevertheless, the implied volume can be easily understood to be a cuboid shape. Because the meshes 31 and 32 geometrically represent the boundary of a volume, method 1000 is capable of accepting them as input.

It will be noted that in order strictly to be the boundary of a volume, a mesh must be a closed two-manifold. The input meshes obtained at step 1100 need in general not be strictly closed or two-manifold, and so need not be strictly a boundary representation of a well-defined volume (or set of volumes). This allows the method to operate on typical artist-authored meshes, which are usually not closed and often not even manifold even if they represent real 3D objects with meaningful internal volumes. For example, when a single volume is modelled by multiple meshes, artists often do not weld the meshes together where they meet. The present method is tolerant of such input and places no topological requirements on the input meshes, as long as they geometrically represent the boundaries of one or more volumes.

At step S1200, a voxel representation of the one or more volumes is calculated.

To this end, a voxel grid, that is, a rectangular three-dimensional grid of cubic voxel elements which entirely enclose the input meshes, may be defined. Any voxels that are inside the input volumes may then be marked as filled.

This may be accomplished in the following manner. First, voxels that overlap faces of the input mesh may be marked as filled. This may have the effect of voxelizing just the boundary of the volumes, leaving their inner regions unfilled. Usefully, this may have the side-effect of closing most small gaps in the input meshes, where any gaps smaller than the size of a single voxel cannot be resolved and so are closed over in the voxelized volume. Furthermore, because artist-authored models often lack bases, any voxels below a certain height may be automatically treated as filled, if they are entirely enclosed by filled voxels horizontally. Finally, any hollow voids in the voxel grid that are completely enclosed by filled voxels may be filled, effectively turning the rasterized boundary into a solid volume.

The filled voxels then form an explicit, approximate representation of the one or more volumes. The quality of the approximation can be controlled readily by selecting an appropriate resolution for the voxel grid.

Figure 4:
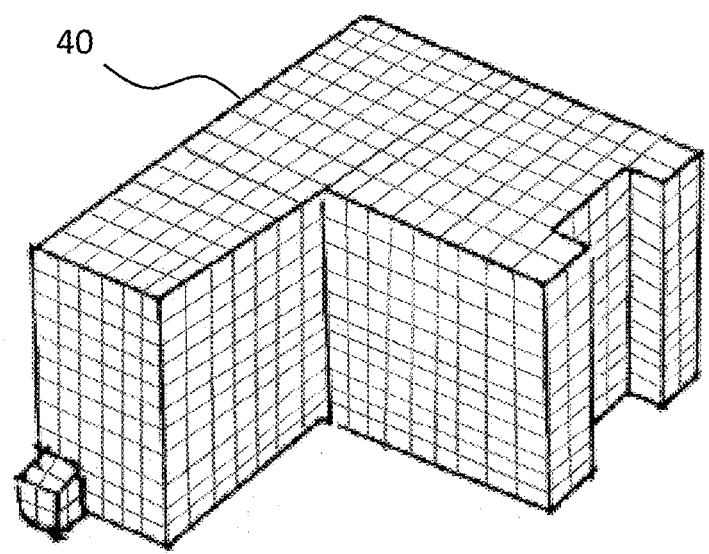
FIG. 4 depicts an example voxel representation of the example volume of FIG. 2, produced according to embodiments of the present specification.

For example, FIG. 4 depicts an example voxel representation 40 of the example volume 20 of FIG. 2. In this case, the example volume 20 is exactly aligned with the axes of the voxel grid; however, in general, it may be not so, and a voxel may be marked as filled as long as it overlaps any part of the one or more volumes.

Returning to FIG. 1, the voxel representation may serve as a reference for determining whether points in space lie within the implied input volume or not. Determining whether a point is within a volume geometrically represented by one or more meshes that are not necessarily closed or two-manifold is generally not possible based on the meshes alone: for example, disconnected meshes as in FIG. 3 cannot reliably be trivially welded. Voxelizing the input volume provides an efficient way of determining whether a point is inside the one or more volumes or not, and for calculating distances of points outside the one or more volumes to the nearest volume.

At step S1300, a distance field of distance to a nearest volume is calculated, which holds, for each voxel that was determined to be outside the one or more volumes, its distance to the nearest point inside the one or more input volumes. In this distance field, each voxel outside the one or more volumes may hold the Euclidean distance of the center of that voxel from the center of the nearest voxel that is inside the one or more input volumes.

Furthermore, the distance field may be extended to voxels inside the one or more volumes, in order to facilitate the calculation of the concavity metric (described below in relation to at step S1420 in FIG. 5). To this end, each voxel inside the one or more volumes may hold the negative distance of the center of that voxel from the center of the nearest voxel that is outside a volume. Thus, the distance field may hold the signed distance of each voxel center from the surface of the one or more volumes, where points outside the one or more volumes have positive signed distance, and points inside have negative signed distance.

The distance field can be computed readily from the voxelized input volumes, using a standard two-pass technique in which distances are updated from their neighbors first in increasing x, y and z directions, and then in decreasing x, y and z directions.

At step S1400, one or more volumes in the input set are split to obtain a transformed, intermediate, set of volumes. In particular, the method may repeatedly pick a volume to split, and split it with a well-chosen plane or intersection loop. The various steps involved are explained in more detail with reference to FIG. 5.

Figure 5:
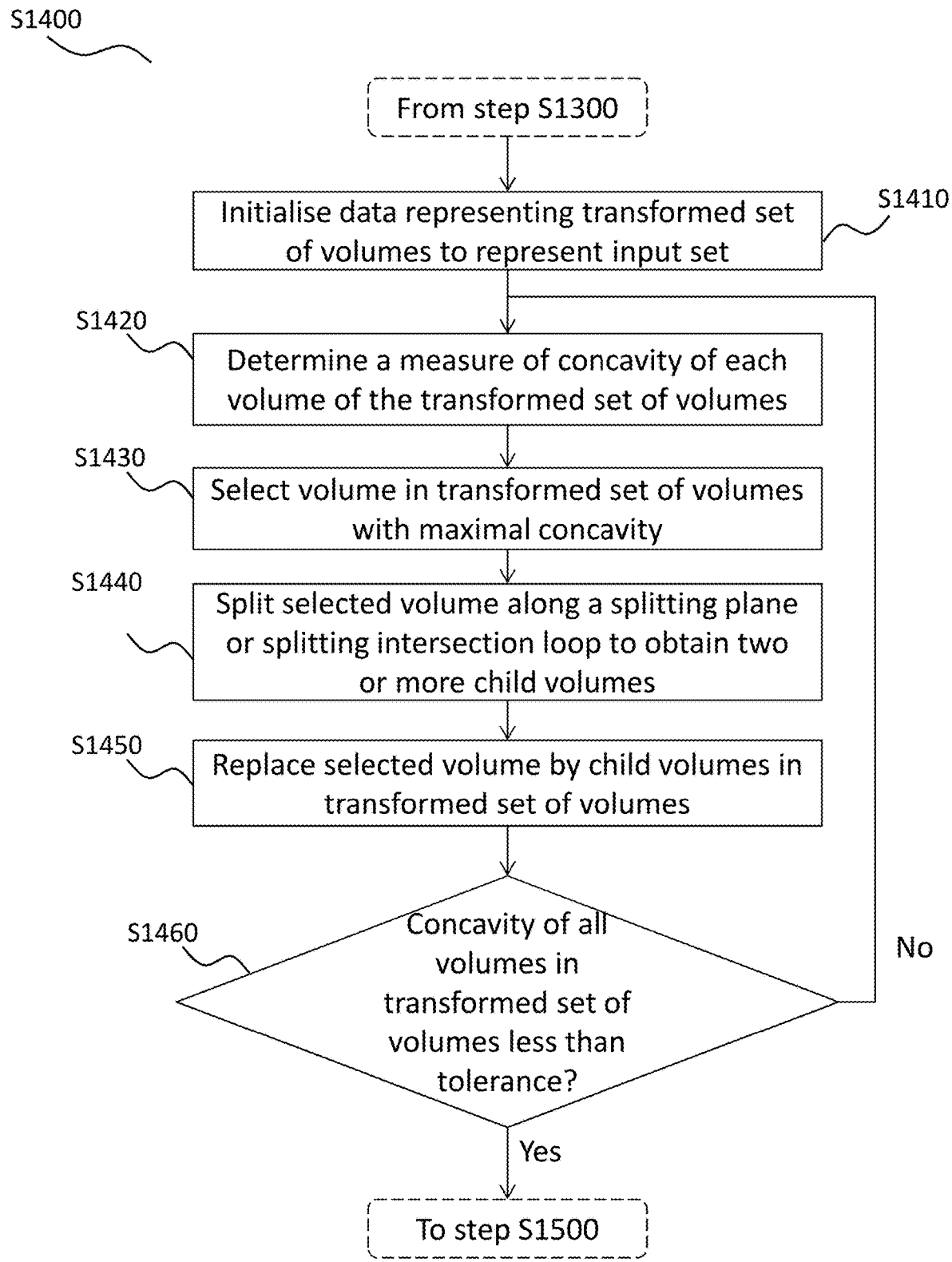
FIG. 5 shows an example method for splitting three-dimensional volumes along planes that intersect deepest concavities of the volumes according to embodiments of the present specification.

Turning to FIG. 5, at step S1410, data representing a transformed set of volumes is initialized to represent the input set of volumes. An intermediate set of volumes is produced by transforming an input set of volumes, or another intermediate set of volumes. After one or more transforms, an output set of volumes is provided by the method 1000.

In particular, if the data representing the input set of volumes is a set of one or more meshes, the data representing a transformed set of volumes may be initialized to the one or more meshes. Each mesh of the input meshes may then be treated as representing a single volume of the transformed set of volumes. The volume represented by each mesh may be taken to be the set of filled voxels which lie within the convex hull of the mesh. In this way, even meshes that are not closed or two-manifold may still be understood as representing a part of the one or more input volumes. The volume represented by a mesh is entirely determined by a combination of the mesh and the voxel representation of the input volumes.

For a mesh that is closed and two-manifold, the volume it represents coincides with its interior volume. As a result, the method may naturally handle the common case in which a manifold is the complete boundary of a separate volume or part of the one or more input volumes. As such, the method may exploit any existing artist-authored segmentation of the mesh into parts. These parts are often already convex or else more easily decomposed in isolation.

The data representing the transformed set of volumes may consist of a priority queue storing a data representation for each volume in the transformed set of volumes. For example, the data representing the transformed set of volumes may be a priority queue storing each mesh of the input meshes.

At step S1420, a measure of concavity of each volume of the transformed set of volumes may be determined. The volumes on the priority queue may then be ordered by concavity—for example, if volumes are represented by a set of one or more meshes, then the meshes on the priority queue may be ordered by the measure of concavity of the volumes they represent.

The concavity of a volume may be measured by an overhang metric of the volume reflecting how well or how poorly the volume is approximated by an approximating convex volume. The approximating convex volume advantageously is the convex hull of the volume, but it may alternatively be a primitive volume (e.g. a cuboid, cylinder or sphere) that is fitted to or encloses the volume. For example, the value of the overhang metric may reflect the extent to which collision detection would be altered if the volume were replaced by its convex hull.

In particular, the value of the overhang metric may indicate the hull overhang of a volume, defined as the maximum distance by which the volume's convex hull extends from the one or more input volumes. Since convex hulls tightly bound their contained geometry, but are convex where the volume is concave, hull overhang is effectively a measure of a volume's non-convexity (concavity).

The hull overhang of a point on the convex hull of a volume may be defined as the distance of the point to the nearest point inside the one or more volumes. The hull overhang of a volume may then be defined as the maximum hull overhang of any point on the convex hull of the volume.

Figure 6A:
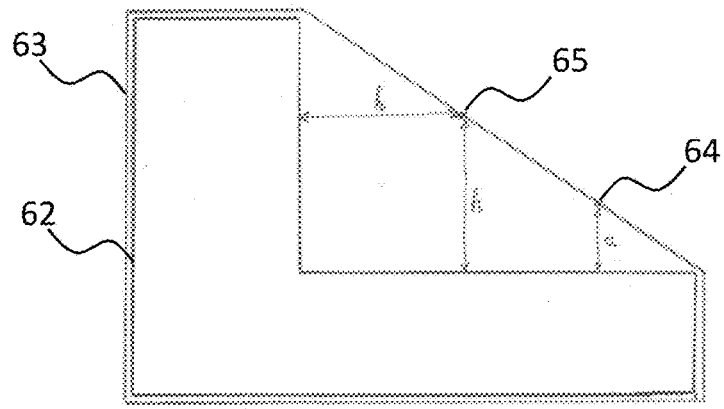
FIG. 6A illustrates the hull overhang of a point on the convex hull of a volume according to embodiments of the present specification.

For example, turning to FIG. 6A, a simple three-dimensional volume 62 is shown in side view along with its convex hull 63. The hull overhang of a point 64 on the convex hull is the distance to the nearest point inside the volume, labelled a. The maximum hull overhang of any point on the convex hull is labelled h, and is obtained at point 65. The hull overhang of the volume 62 is therefore equal to h.

Because hull overhang measures the maximum distance of the convex hull of a volume from any point in the one or more input volumes, the convex hull is not penalized for extending away from the volume, as long as it is still near some other part of the one or more input volumes.

To calculate the hull overhang of the volume represented by a mesh, the convex hull of the mesh may be computed. The hull overhang of each voxel overlapping the convex hull of the volume may then be calculated and the maximum of those values may be obtained as the hull overhang of the volume.

Figure 6B:
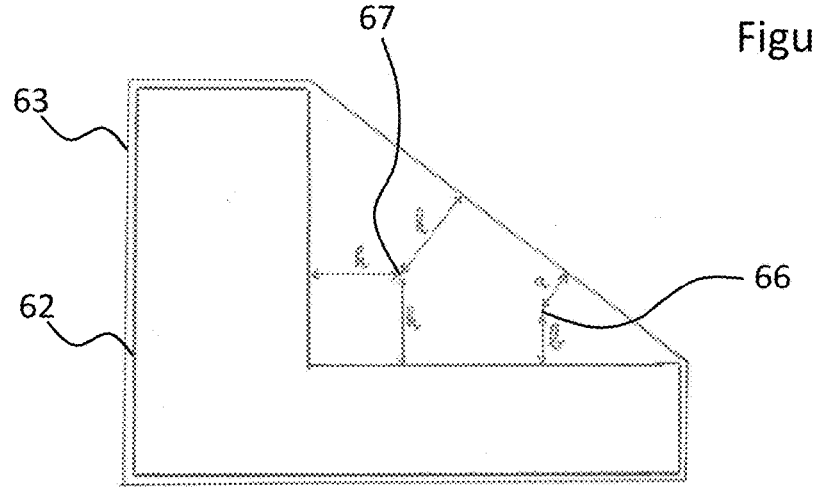
FIG. 6B illustrates the generalized overhang of a point in space according to embodiments of the present specification.
Figure 6C:
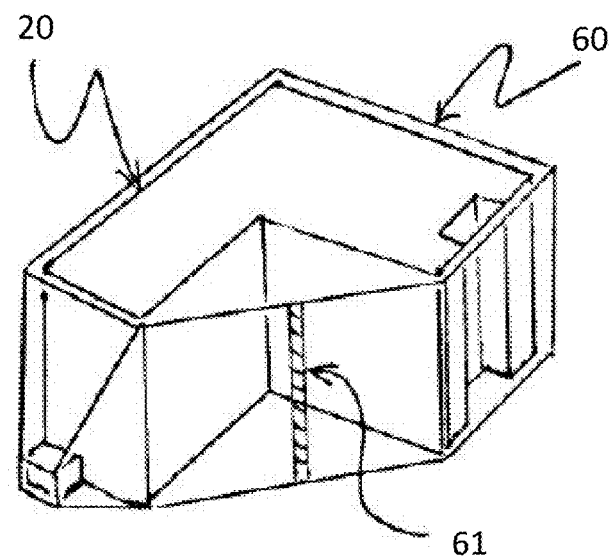
FIG. 6C illustrates the hull overhang of the example volume of FIG. 2 according to embodiments of the present specification.

The result may be seen in FIG. 6C, where the non-convex volume 20 of FIG. 2 and its convex hull 60 are illustrated. The area of maximum hull overhang 61 is shaded, composed of the points on the convex hull 60 that are furthest from their corresponding nearest points in the volume 20.

Alternatively, the overhang metric for a volume may be the generalized overhang of the volume.

The generalized overhang of a point in space may be defined as the difference between the signed distance of that point from the nearest point on the surface of the volume, and the signed distance from the nearest point on the surface of the convex hull of the volume. By convention, the signed distance of a point from the nearest point on the surface of the volume is positive if the point is outside the volume, and negative if it is inside. Likewise, the signed distance of a point from the nearest point on the surface of the hull is positive if the point is outside the hull, and negative if it is inside.

For a point within the convex hull of the volume and outside of the volume, its generalized overhang will thus be the sum of its distances to the nearest point on the surface of the volume and to the nearest point on the convex hull. Therefore, the generalized overhang of such a point measures the shortest path from the convex hull to the surface of the volume that passes through the point.

The generalized overhang of a volume is then determined as the maximum of the generalized overhang of all points in space.

For example, turning to FIG. 6B, the same three-dimensional volume 62 of FIG. 6A and its convex hull 63 are illustrated. The generalized overhang of a point 66 is equal to (signed distance to the nearest point on the surface of the volume)−(signed distance to the nearest point on the convex hull), which in this case is given by a−(−b)=a+b as point 66 is inside the convex hull but outside the volume. The point 67 with maximum generalized overhang is shown, with a generalized overhang of 2 h.

It may be shown that the maximum value of generalized overhang for any point is always attained at a point which is inside the convex hull of the volume but outside the volume. The generalized overhang of the volume thus conveniently measures the maximum length of all the shortest paths from the surface of the volume's convex hull to the surface of the volume, passing through any point between the volume and the hull surface. This provides a finer estimate of the distance that a typical convex object may penetrate the convex hull without penetrating the volume.

It will be noted that the generalized overhang of a point is equal to its overhang for points on the convex hull of the volume. Advantageously however, the generalized overhang is continuous for all points in space, and is stable in the neighborhood of the point with maximum generalized overhang. In other words, in the vicinity of the point where generalized overhang is maximal, small perturbations of the point of evaluation do not significantly affect the value of the generalized overhang. Because of this, generalized overhang is robust to the numerical inaccuracy introduced by voxelization. In particular, the error induced by approximation of the generalized overhang by using the voxel representation of the volumes (which allows the computational cost to remain low) strongly diminishes as the resolution of the voxel grid is increased.

In contrast, for hull overhang, a perturbation of the point of evaluation in the direction normal to the convex hull may cause significant errors in the calculated value of hull overhang. As a result, hull overhang is more sensitive to inaccuracies introduced by voxelization.

To calculate the generalized overhang of the volume represented by a mesh, the convex hull of the mesh may be computed. A generalized overhang value may then be computed for each voxel in the voxel grid, based on the convex hull and on the signed distance field calculated at step S1100. The generalized overhang of a convex hull may thus be determined as the maximum of all those values. Since the point of maximum generalized overhang necessarily lies within the convex hull, it may suffice to calculate the overhang values for voxels which lie inside an axis-aligned bounding box of the hull, for efficiency. Calculating the generalized overhang of a volume does not require checking whether a voxel lies on the convex hull of the volume, thus reducing the needed computation.

Other measures of concavity are possible, including for example the proportion of the voxels inside the hull that are not located inside the input volume, or the maximum depth of any unfilled voxel inside the hull. However, overhang metrics, notably the hull overhang and generalized overhang described above, advantageously provide an indication of the maximum collision error resulting from the use of the hull as an approximate collision representation for the part of the input volume it bounds. That is, the maximum distance that a foreign object can penetrate the hull without also penetrating the input volume.

At step S1430, a volume with relatively high concavity in the transformed set of volumes is selected for splitting. For example, the first volume may be popped off the priority queue, where the priority queue was ordered in order of decreasing concavity, so that the volume with the highest concavity is selected first. In this way, a volume that is least well approximated by its convex hull is prioritized for splitting. If there are multiple volumes with approximately equally high concavities, any of them may be selected for splitting first. Further alternatively, multiple volumes, with similarly high concavities may be selected and split in parallel with one another. This can facilitate parallel processing within the method, thus better utilizing computational resources of the system.

At step S1440, the selected volume is split along a splitting plane or splitting intersection loop to obtain two child volumes. Step S1440 is described in further detail with reference to FIG. 7.

Figure 7:
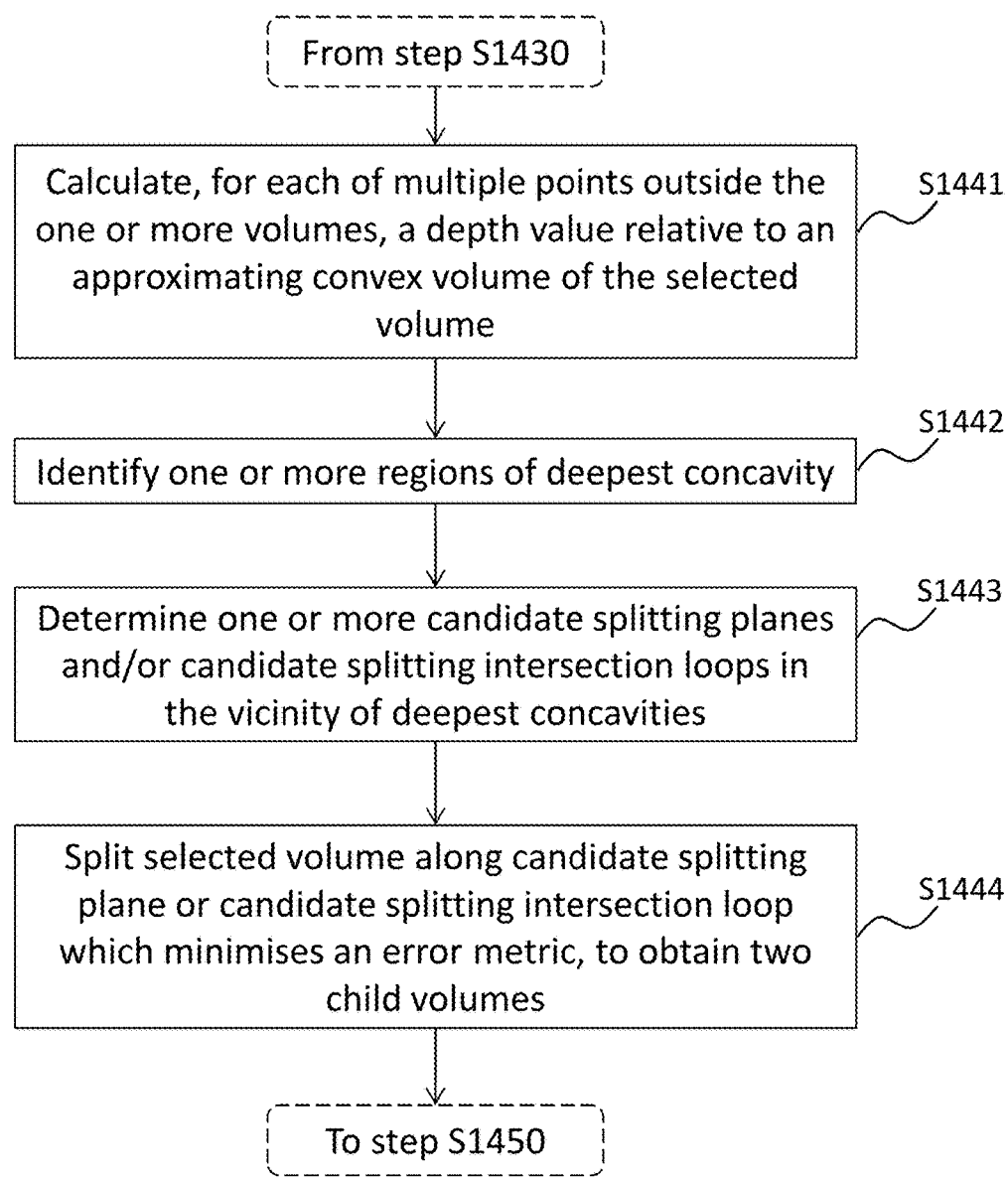
FIG. 7 shows an example method for splitting a three-dimensional volume along a plane that intersects a deepest concavity of the volume according to embodiments of the present specification.

Turning to FIG. 7, at step S1441, for each of multiple points outside or on the surface of the one or more volumes, a depth value relative to an approximating convex volume of the selected volume is calculated. The approximating convex volume advantageously is the convex hull of the volume, but it may alternatively be a primitive volume (e.g. a cuboid, cylinder or sphere) that is fitted to or encloses the volume. The approximating convex volume may be the same as that used above to determine the concavity of the selected volume. The depth value for a point measures its depth relative to the approximating convex volume of the selected volume, that is, the length of the shortest path from the point to a point outside the approximating convex volume, where the path remains outside the one or more volumes. The depth value for a point provides a measure of how deep in a concavity the point lies, and enables deepest concavities of the one or more volumes which lie within the approximating convex volume of the selected volume to be identified. The deepest concavities provide optimal locations for a splitting plane or splitting intersection loop to split the selected volume into volumes with reduced concavity.

Advantageously, in some embodiments, a depth value may be calculated for each voxel which was determined to lie outside the one or more volumes, forming a depth field.

The computation of the depth field may be an iterative process and may proceed in one or more passes. Initially all voxels of the depth field may be reset to known initial values. Voxels that lie inside the input volume or outside the approximating convex volume of the selected volume may be set to a depth value of zero; the approximating convex volume of the selected volume may have already been computed at step S1420. All other voxels may be initialized to a large depth value, such as the maximum depth value that can be represented by a data object representing a depth value. Then, in a series of passes through the field, the depth values of the non-zero voxels may be successively updated. Each update to the depth of a voxel may reduce the depth value of that voxel and effectively reflects a new, shorter path to that voxel from a voxel outside the convex hull of the volume. The series of passes may terminate when a pass fails to improve the depth values of any voxels.

In each pass, the new, updated, depth values may be written into a temporary depth field, to avoid prematurely overwriting the current values. The updated values may be updated from the temporary field at the end of the pass, ready for the next pass.

In each pass, the updated depth values in the temporary field may be initialized to the current depth values in the depth field. Then, iterating through all voxels, the current depth value of each voxel may be used to compute the depth values of its neighboring voxels. The neighboring voxels of a voxel may be its 6 immediate neighbors in the axial directions, or its 26 neighbors which have at least one vertex in common with the voxel. For each neighboring voxel, a candidate depth value may be computed, given by the current depth value of the current voxel plus the distance between the neighboring voxel and the current voxel, where the distance between the neighboring voxel and the voxel is given by the square-root of the sum of the squares of the coordinates of the grid offsets between them. If the candidate depth value for the neighboring voxel is less than the current depth value of the neighboring voxel, the depth value of the immediate neighbor may be computed as the candidate depth value. The neighboring voxel's depth value in the temporary field may then be updated with the computed depth value.

In each pass, it may be the case that only voxels with non-zero depth values, i.e. which lie inside the hull and outside the one or more volumes, are updated. Voxels with a depth value of zero, i.e. which lie outside the hull and outside the one or more volumes, may be left at a depth of zero. Voxels inside the one or more volumes may be treated as impassable.

In each pass, all the voxels in the depth field may be visited. By using a temporary buffer, voxels may be visited in any order, such that a convenient raster order may be chosen to improve processing efficiency in a dedicated processing unit such as a graphics processing unit. Furthermore, to improve efficiency, the voxels visited in each pass may be limited to those within the axis-aligned bounding box of the voxels which were updated by the previous pass, where the bounding box is initialized as the whole voxel grid in the first pass.

Once the depth field has been computed, the depth value of each non-zero voxel may represent the length of the shortest path to that voxel from a voxel outside the hull. The distances are geodesic rather than Euclidean, and reflect non-straight voxel paths that avoid voxels inside the input volume, which are treated as impassable. As a result, the voxels with greatest depth value may lie deepest within concavities of the selected volume, with respect to the surface of the convex hull bounding the selected volume.

Figure 8:
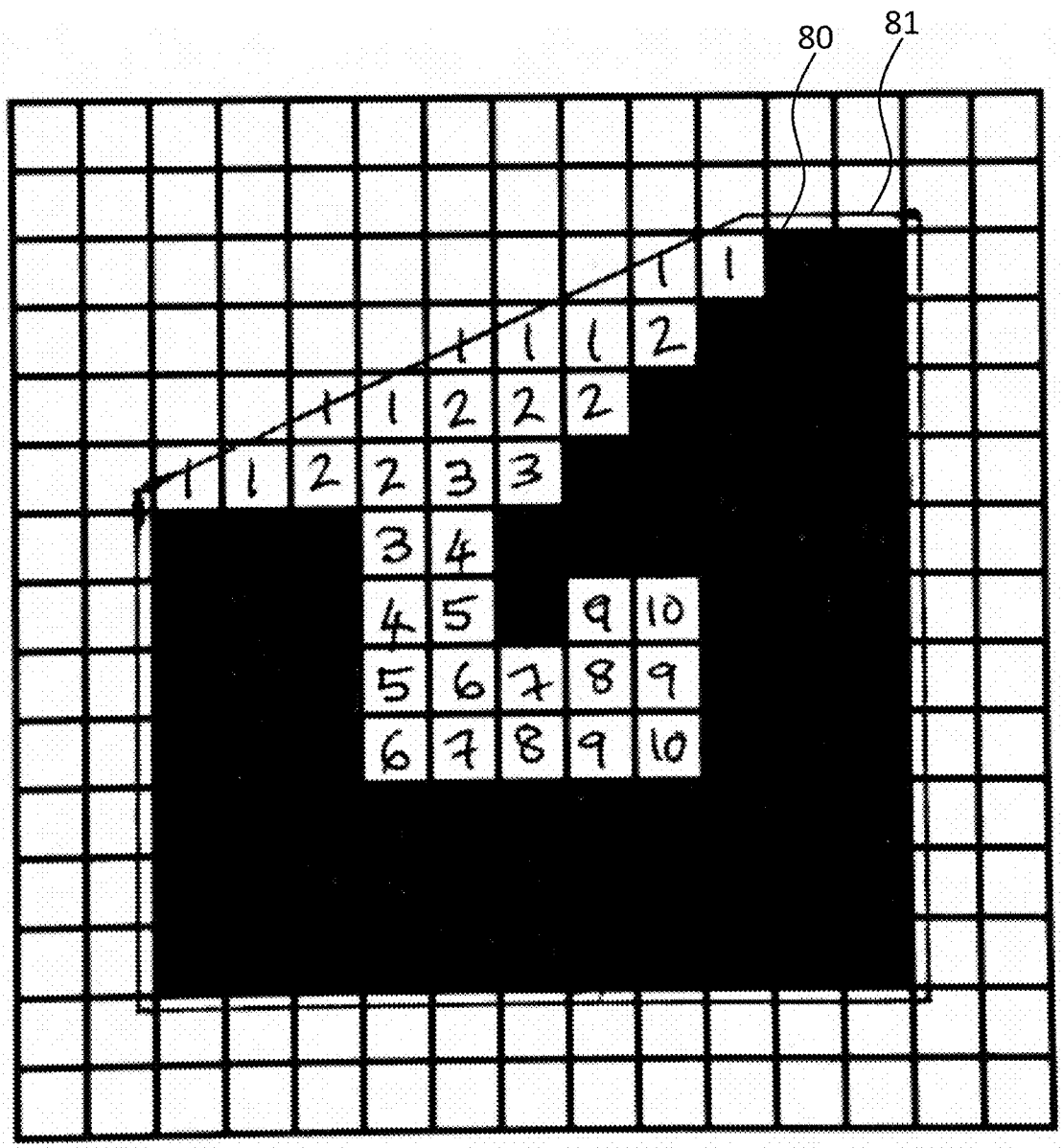
FIG. 8 illustrates a measure of concavity depth produced according to embodiments of the present specification.

Turning to FIG. 8, the measure of concavity depth is illustrated. FIG. 8 shows an example voxel representation 80 of an example three-dimensional volume seen from along an axis of the voxel grid, where voxels inside the volume are shaded black. A convex hull 81 of a volume (in this case, the entire volume) is marked in black lines. Voxels that are inside the hull but not inside the input volume are marked with their computed depth values; all other voxels have an implied depth of zero.

In some embodiments, a depth value may be calculated for multiple points that are not voxels which lie outside the one or more volumes. For example, the depth of a point may be estimated by sampling multiple paths from the point to a point outside the approximating convex volume of the selected volume, where each path lies entirely outside the one or more volumes, and determining the minimum length of the sampled paths. In particular, it may suffice to calculate the depth for points lying on the surface of the volume, for example, the points of a surface grid of a certain resolution which is fitted to the surface of the volume.

At step S1442, one or more regions of deepest concavity are identified within one or more concavities of the selected volume. To this end, voxels whose depth lies within a small tolerance of the maximal depth of any voxel may be identified as forming part of the regions of deepest concavity. For example, the regions of deepest concavity may be identified as the voxels whose depth value lies within a user-defined tolerance of the maximum depth of any voxel, such as within 5%, 10% or 20% of the maximum depth of any voxel in the concavity. Allowing for a small tolerance enables the method to consider edges and faces that lie near though not directly adjacent to the point of deepest concavity for determining candidate splitting planes and/or splitting intersection loops. In this way, useful candidate splitting planes and/or candidate splitting intersection loops may be considered which otherwise would not have been considered. However, increasing the tolerance comes at the trade-off of generating more candidate splitting planes and/or candidate splitting intersection loops, which may increase the computational cost of running the method.

The one or more regions of deepest concavity may lie in the same concavity of the selected volume, or, alternatively, may lie in different concavities, for example if there are several similarly deep concavities. In this way, if there are multiple similarly deep concavities, the method may construct candidate splitting planes and/or candidate splitting intersection loops in all similarly deep concavities before choosing the optimal split, which may or may not be in the concavity having the actual greatest depth.

Advantageously, such a voxel-based approach to finding deepest concavities of the input volume need not rely on mesh topology. The voxel representation of the volume can be inferred even from an ill-formed input mesh that is neither strictly closed nor strictly manifold.

Figure 9A:
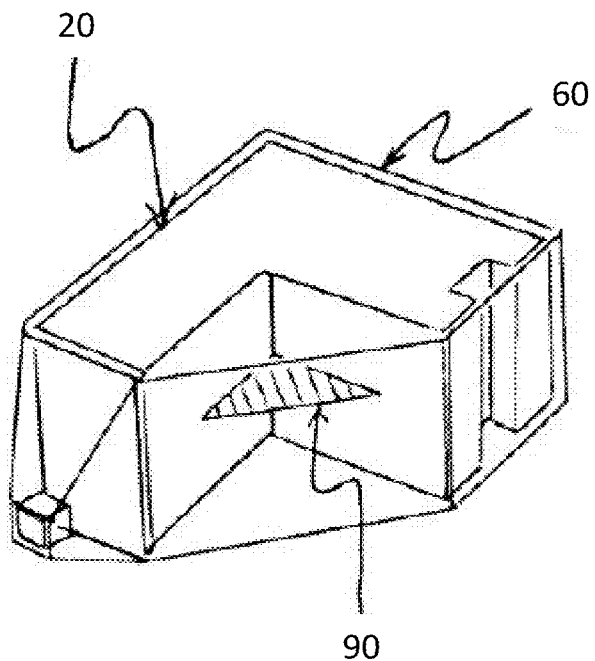
FIG. 9A depicts an example region of deepest concavity on the volume of FIG. 2.

For example, turning to FIG. 9A, the example volume 20 of FIG. 2 and its convex hull 60 are depicted. A region of deepest concavity may then be identified as the shaded area 90, which comprises voxels with maximal depth.

At step S1443, having identified one or more regions of deepest concavity, one or more candidate splitting planes and/or candidate splitting intersection loops coincident with or adjacent to the regions of deepest concavities may be determined. That is, candidate splitting planes and/or candidate splitting intersection loops may be determined that have at least one point in common with a region of deepest concavity.

In particular, if the selected volume is represented by a mesh, the faces and edges of the mesh that are coincident with or adjacent to the regions of deepest concavity may be identified, and the faces and edges used to generate candidate splitting planes and/or candidate splitting intersection loops.

An intersection loop of a volume is a closed one-dimensional curve indicating the location where the boundaries of two sub-volumes of the volume intersect. Two sub-volumes of a volume are two volumes which are each comprised within the volume and together cover exactly the volume.

An intersection loop may in particular be a closed loop of line segments, though this is not necessarily the case. Furthermore, an intersection loop of a volume may be composed from pre-existing edges of the volume, to exploit any segmentation hints provided by the artist, in which case it is a closed loop of edges; however, in general this need not be the case.

Figure 15:
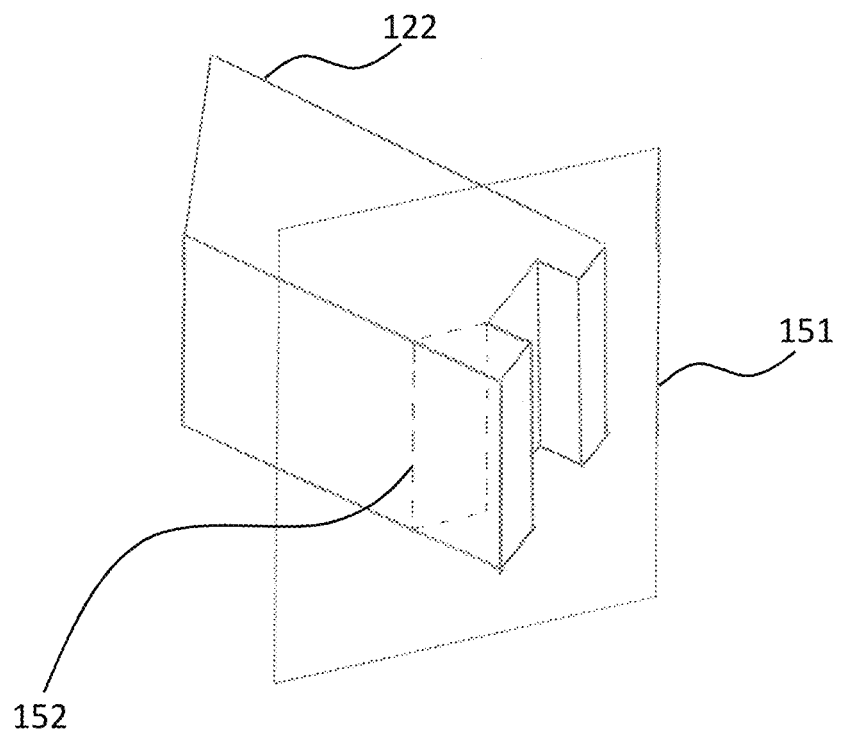
FIG. 15 depicts an example candidate splitting plane on the volume of FIG. 14 produced according to embodiments of the present specification.
Figure 16:
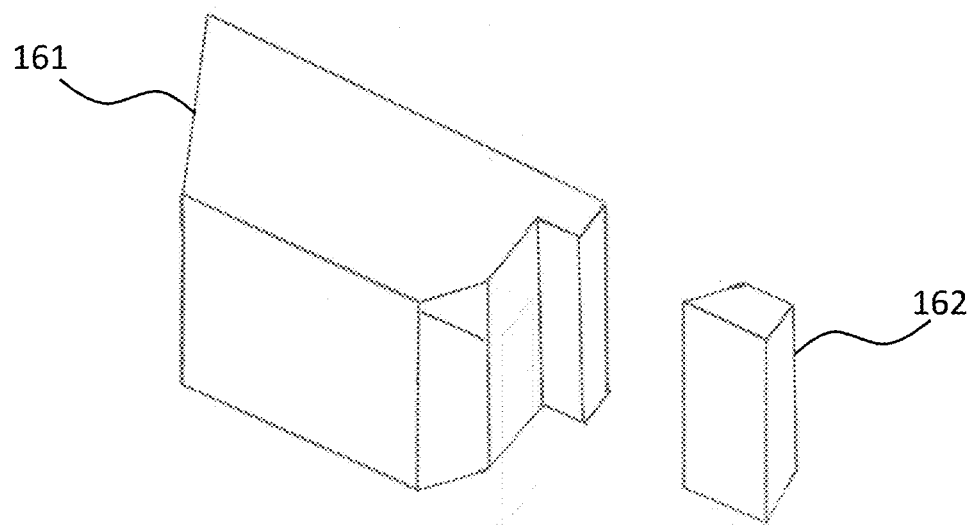
FIG. 16 depicts an example split of the volume of FIG. 14 into two three-dimensional volumes produced according to embodiments of the present specification.

For example, briefly turning to FIGS. 15 and 16, the dashed closed curve 152 composed of line segments is the intersection loop of the sub-volumes represented by meshes 161 and 162, which are sub-volumes of the volume represented by mesh 122.

An intersection loop may be used to split a volume into two sub-volumes, one on either side of the intersection loop.

When splitting a volume with a plane or at an intersection loop, the aim is to split the volume into two pieces which are as convex as possible, and so will be well approximated by their own new convex hulls. Concavities in the voxelized input volume tend to be good places to split the volume, since these hint the locations of intersection loops where convex sub-volumes meet.

Figure 9B:
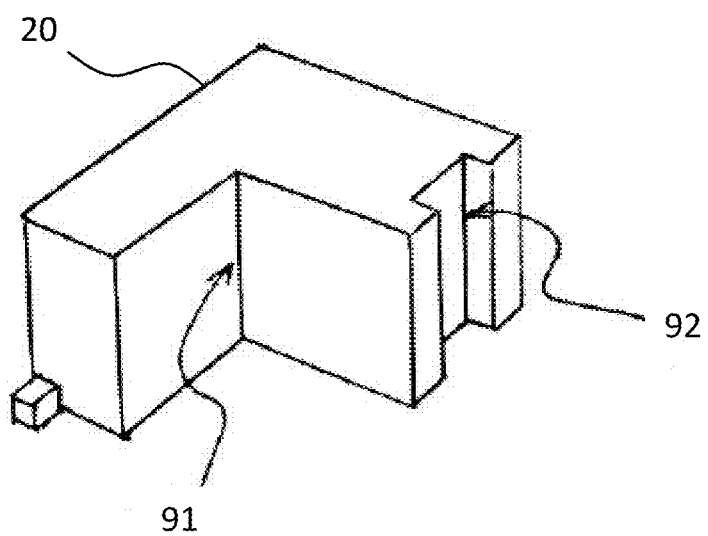
FIG. 9B depicts concave edges of the example volume of FIG. 2.

This is illustrated in FIG. 9B, which depicts the example volume 20 and two of its concave edges labelled 91 and 92. It is advantageous to choose a splitting plane or intersection loop in the vicinity of edges that lie in deeper concavities of the volume, since planes or intersection loops splitting the volume at those edges tend to create larger, more convex child volumes. In the example above, concave edge 91 lies in a deeper concavity than does concave edge 92, so indicates a better place to split the volume. In particular, the best splitting plane or intersection loop is the plane which is suggested by the concave edge 91 and an incident planar edge (not shown) extending to the distant convex vertex. This plane neatly splits the volume into two pieces which are both close to convex, omitting the significant concavity at edge 91. Slightly less effectively (in terms of the complexity of the resulting volumes), splitting planes aligned with either of the two faces incident to edge 91 also serve to split the volume into nearly convex pieces. Finally, the plane that splits the angle between those two faces will also split the volume into nearly convex pieces, albeit not as well.

Returning to FIG. 7, given concave edges and faces in the vicinity of the deepest voxels, candidate splitting planes of three types and/or candidate intersection loops may be constructed.

One or more candidate splitting planes and/or intersection loops of a first type may be determined from concave edges in the vicinity of the deepest voxels.

For each concave edge identified in the vicinity of the deepest voxels, at least one sequence of adjacent edges may be constructed. The sequence may be constructed iteratively, starting from the identified concave edge. At each iteration, the last edge to have been appended to the sequence may be denoted the incoming edge and a vertex belonging to the incoming edge which does not belong to another edge of the sequence may be denoted the current vertex. At each iteration, one of the other edges connected to the current vertex may be selected and appended to the sequence.

The selecting of the next edge at each iteration may be performed according to a criterion that favors producing a sequence which seeks and follows concavities, and which therefore is suited to produce an intersection loop of two sub-volumes of the selected volume each of which is more convex than the combined selected volume.

Given an incoming edge, selecting the next edge in the sequence may proceed in the following manner.

First, edges and vertices may be classified in support of the selection system. Each edge may be classified as either convex, concave or planar based on the geometry of the two faces which the edge separates. This classification may be performed in a conventional way: for example, each outgoing edge may be classified based on its dihedral angle, that is, the angle between the normals of the faces that the edge separates, or, alternatively, based on examining whether a line connecting a point on each face lies inwards or outwards of the surface defined by the two faces. If the edge is within a small tolerance of being planar, the edge may be classified as planar, the small tolerance serving to avoid spuriously classifying essentially-planar edges as convex or concave due to arithmetic noise.

Figure 10A:
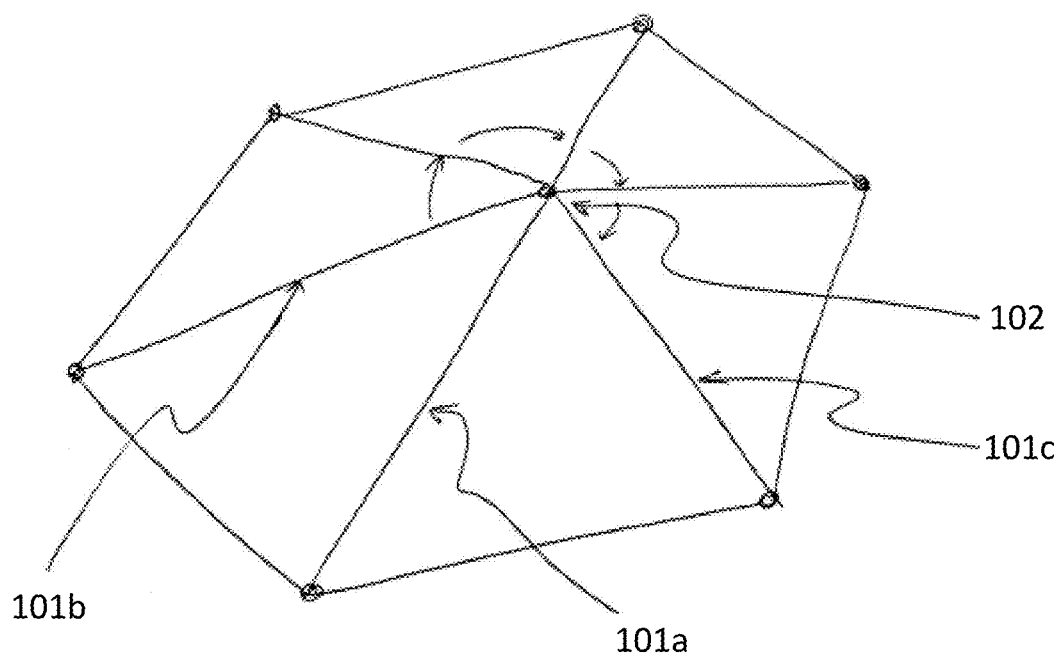
FIG. 10A depicts an example vertex which has a complete ring of faces and edges around it.
Figure 10B:
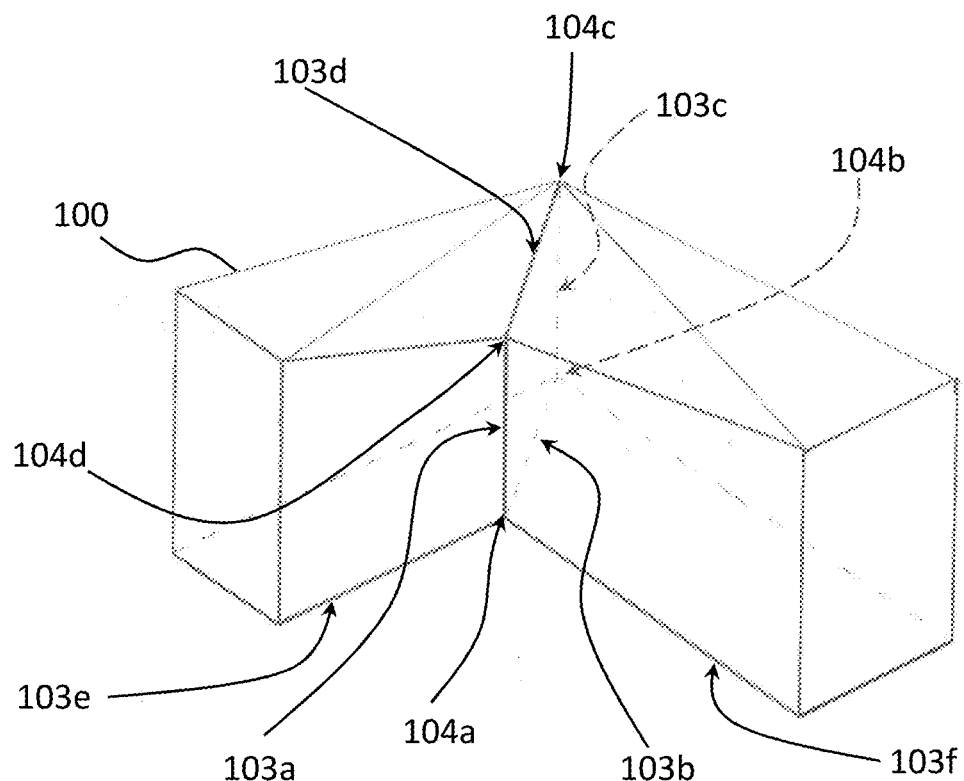
FIG. 10B depicts an example concave volume.

For instance, in FIG. 10B which depicts an example three-dimensional volume too, edges 103a and 103d may be classified as concave edges, edge 103b may be classified as a planar edge, and all other edges, including edges 103c, 103e and 103f, may be classified as convex edges.

The classification system may decline to classify edges which lie on an open boundary of the volume, that is, which are incident to at most one face, or which lie in a region of non-manifold geometry, that is, which are incident to three or more faces or are incident to two faces whose normals inconsistently define the outward direction, that is, normals which point outwards on opposite sides of the surface defined by the two faces.

A concave edge necessarily lies adjacent to a concavity of the selected volume. In addition, a set of edges comprising at least one concave edge and zero or more planar edges which are disposed consecutively around a vertex lie adjacent to the same concavity of the selected volume.

One or more vertices may be classified as one or more of planar, convex, concave, convex hyperbolic, and/or concave hyperbolic. A planar vertex is one whose incident faces belong to the same plane. A convex vertex is one which locally protrudes out of the selected volume. A concave vertex is one which lies within a local depression in the selected volume. A convex hyperbolic vertex is a saddle point which links at least two ridges in the selected volume. A concave hyperbolic vertex is a saddle point which links at least two valleys in the selected volume. Thus it is possible for a vertex to be both convex hyperbolic and concave hyperbolic.

In particular, each vertex which is not connected to any declined edge may be classified as one or more of planar, convex, concave, convex hyperbolic, or concave hyperbolic, based on the edge classification. A vertex may be classified as planar if it is connected only to planar edges, as convex if it is connected to no concave edges (i.e. only convex and planar), or as concave if it is connected to no convex edges (i.e. only concave and planar). Furthermore, a vertex may be classified as convex hyperbolic if it is connected to two or more convex edges and one or more concave edge. A vertex may be classified as concave hyperbolic if it is connected to two or more concave edges and one or more convex edge.

This classification allows any vertex which is not connected to a declined edge to be classified.

Furthermore, the classification of each vertex may be further informed by an analysis of local curvature at the vertex, or may alternatively be solely based on an analysis of local curvature at the vertex. For example, the presence of two concave edges and a convex edge at a vertex may be insufficient to classify the vertex as concave hyperbolic, as the two concave edges might be comprised within the same concavity. An analysis of local curvature may determine the actual number of concave valleys and convex ridges at a vertex and classify the vertex accordingly.

For instance, in FIG. 10B, vertices 104a and 114c may be classified as convex hyperbolic, vertex 104b may be classified as convex, and vertex 104d may be classified as both convex hyperbolic and concave hyperbolic. All other vertices may be classified as convex.

The classification system may decline to classify any vertex which is connected to any declined edge, such as any vertex that lies on an open boundary of the selected volume. Furthermore, at any vertex which is over-shared, that is, connected to more than one two-manifold locally, the several two-manifolds may be disconnected from one another and the over-shared vertex may be replaced by several nominally-distinct vertices at the same location, one for each manifold. The resulting vertices may then be classified individually. As such, each classified vertex may be guaranteed to have a complete ring of edges and faces around it. Such an assumption may simplify the implementation; however, the skilled person will realize that more sophisticated implementations are also possible which omit the assumption.

The topology around each classified vertex may thus be akin to that around vertex 102 in FIG. 10A. FIG. 10A depicts an example edge 101a, an example vertex 102, and other edges including edges 101b and low. Edge 101b is the first edge to be encountered in a clockwise direction around vertex 102, starting from edge 101a. Edge low is the first edge to be encountered in an anticlockwise direction around vertex 102, starting from edge 101a.

Having classified the edges and vertices of the volume, the next edge in the sequence may then be chosen. First, in the case where the current vertex of the sequence is not classified, for example, if the current vertex lies on an open boundary of a volume, the construction of the sequence may stop and the sequence may either be used as-is to generate a splitting plane, or may be discarded altogether.

Assuming that the current vertex of the sequence is classified, it may be determined whether one or more of the outgoing edges are concave. If one or more outgoing edges are concave, a concave outgoing edge may be selected and added to the sequence. In particular, the first concave outgoing edge encountered in a default order, which may be the clockwise or anticlockwise order, starting from the incoming edge, may be selected and added to the sequence. Adding any concave outgoing edge to the sequence enables the sequence to follow natural concavities in the selected volume. By choosing the first concave outgoing edge encountered in the default order starting from the incoming edge, a single loop which bounds a simple, most convex feature, and which does not intersect other possible loops, may be obtained.

If the current vertex and all neighboring vertices are planar, where the local geometry provides no particular clue as to how to continue the sequence, the construction of the sequence may in some embodiments stop and the sequence may either be used as-is or discarded altogether. In other embodiments, the sequence may in such cases follow the first edge to be encountered in the default order around the current vertex. Alternatively, the mesh around the current vertex may be explored, the vertices at the boundary of the planar region may be identified and lines connecting the current vertex to each vertex at the boundary of the planar region may be considered as outgoing edges, one of which will be selected to continue the sequence; such an operation does not cause any change in the geometry of the selected volume as long as it is restricted to a planar region of the selected volume.

If none of the outgoing edges are concave, that is, if all outgoing edges are convex or planar, the end vertices of each outgoing edge may be examined to determine whether they are connected to a suitable concave edge that may be followed. In particular, a score may be assigned to each of the outgoing edges, and an outgoing edge with greatest score may be selected and added to the sequence. If two outgoing edges have the same highest score, one of the outgoing edges with highest score may be selected and added to the sequence. For example, the first outgoing edge with highest score encountered in the default order starting from the incoming edge may be selected and added to the sequence.

The scores of the outgoing edges may be calculated as follows. The score for each outgoing edge may be initialized at a common baseline, and may then be increased based on the configuration at the start vertex of the outgoing edge, and/or the configuration at the end vertex of the outgoing edge. The start vertex is the current vertex and the end vertex is the vertex to which the outgoing edge leads.

In a first stage, the score for each outgoing edge may be increased based on the configuration at the end vertex of the outgoing edge. In particular, if the end vertex is connected to at least one concave edge, the score may be increased. Indeed, since the outgoing edge is not concave, such an end vertex is necessarily connected to a concave edge which differs from the outgoing edge. Such a concave edge lies along a concavity which is adjacent to the end vertex, and along which it may be desirable to continue the sequence.

In some embodiments, the condition that the end vertex is connected to at least one concave edge may be insufficient to increase the score of an outgoing edge. Rather, the score may be increased if the end vertex is convex hyperbolic and is adjacent to a concavity leading away from the current vertex.

Whether a first convex hyperbolic vertex is adjacent to a concavity leading away from a second vertex may be determined in the following manner. Recall that a concavity adjacent to a vertex may be identified by a concave edge connected to the vertex. Since the first vertex is convex hyperbolic, it is connected to at least two convex edges; therefore, each concave edge connected to the first vertex necessarily has a nearest convex edge in each of the clockwise and anticlockwise directions, denoted the "bookend edges" of the concave edge at the first convex hyperbolic vertex. These bookend edges mark the ridges which bound the concavity containing the concave edge. Then, the concavity identified by a concave edge connected to the end vertex may be determined to lead away from the second vertex if both bookend edges lead away from the second vertex. An edge connected to a first vertex is said to lead away from a second vertex, if the distance between the first vertex and the second vertex is less than the distance between any other point on the edge and the second vertex.

In this way, end vertices connected to a concave edge may be favored where the concave edge hints a concavity leading away from the current vertex, rather than a side concavity leading back towards it.

In yet other embodiments, the score for an outgoing edge may be increased by a first amount if the end vertex is connected to at least one concave edge, and increased by a further amount if the end vertex is convex hyperbolic and adjacent to a concavity leading away from the current vertex.

In a second stage, the score for each outgoing edge may be increased based on the configuration at the start vertex of the outgoing edge, that is, the current vertex. In particular, the score for an outgoing edge may be increased if its start vertex is convex hyperbolic and is adjacent to a concavity leading away from the end vertex. Such a concavity, if it exists, is adjacent to the last concave edge in the sequence. In this way, if the current vertex is convex hyperbolic, an outgoing edge may be preferably selected that leads away from a concavity from whence the sequence of edges came.

Additionally or alternatively to analyzing whether the start vertex is convex hyperbolic and adjacent to a concavity leading away from the end vertex of the outgoing edge, a further criterion may be used to favor promising outgoing edges and/or penalize unpromising outgoing edges. In particular, some embodiments may penalize a number of consecutive outgoing edges that are deemed to lead back in the direction from whence the incoming edge came. The consecutive penalized backward-leading edges may range from an ending bounding edge (inclusive) to a starting bounding edge (inclusive), where the consecutive edges include the incoming edge. In this way, a limited range of forward-leading outgoing edges around the current vertex, from the starting bounding edge (exclusive) to the ending bounding edge (exclusive) may be preferably considered. The starting bounding edge and the ending bounding edge may both be taken to be the incoming edge; however, in some embodiments, if the current vertex is convex, the starting and ending bounding edges may be taken to be the nearest convex (i.e. non-planar) edges to the incoming edge, in the clockwise and anticlockwise directions, respectively. In this way, the sequence may penalize any backward-leading outgoing edges, up to and including the bounding edges, ensuring that the sequence progresses forward until it can follow a new concavity. Outgoing edges which are deemed unpromising in this manner may be penalized by having their score reduced, or be discarded altogether before scoring, such that they will not be selected as the next edge in the sequence. Furthermore, in some embodiments, each outgoing edge may have its score increased if it leads away from all the bounding edges at the start vertex, and/or have its score decreased (or be rejected altogether) if it does not lead away from all the bounding edges at the start vertex. For example, at a convex vertex, an outgoing edge that leads away from the two closest convex edges on either side of the incoming edge may have its score increased, and at a non-convex vertex, each outgoing edge that leads away from the incoming edge may have its score increased.

The various criteria for outgoing edges described hereabove may be combined as desired, in their "soft" versions (i.e. increasing or reducing the score of an outgoing edge) or "hard" versions (i.e. eliminating an outgoing edge outright), in order to favor the construction of a sequence that seeks and follows concavities with the aim of forming a loop.

The construction of the sequence of edges may stop when the sequence of edges forms a closed loop. Such a loop may then be used as a candidate splitting intersection loop for splitting the selected volume.

Alternatively, the construction of the sequence of edges may stop as soon as a pair of adjacent edges in the sequence is non-collinear, such that a candidate plane is defined by the non-collinear edges. In this way, a plane that is well-fitted to an intersection loop of two sub-volumes with lower concavity than the selected volume may be constructed without the complexity of constructing an entire loop. Furthermore, promising splitting planes may be identified even in a volume that does not support constructing an entire loop of edges from the edge adjacent to a region of deepest concavity, for example, if the region of deepest concavity lies near a non-closed, non-manifold, or poorly-triangulated region of the surface of the volume.

An example construction of a sequence of edges is now described with reference to FIG. 10B, starting from concave edge 103*a* which is proximate to a deepest concavity of volume 100, and taking the first current vertex to be vertex 104*a*.

At vertex 104*a*, there are three outgoing edges 103*b*, 103*e* and 103*f*. None of the outgoing edges are concave: edge 103*b* is planar, and edges 103*e* and 103*f* are convex. Therefore, none of them are immediately selected as the next edge; rather, a score for each outgoing edge may be calculated. To calculate the score for each outgoing edge, in a first stage, the configuration at the end vertex of each of the three outgoing edges is considered. None of the three outgoing edges leads to a convex hyperbolic vertex, therefore, no outgoing edge has its score increased in the first stage. In a second stage, the configuration at the start vertex is considered. Edge 103*b* satisfies the property that its start vertex 104*a* is adjacent to a concavity leading away from its end vertex 104*a*, namely, the concavity lying adjacent to edge 103*a*; therefore, the score for edge 103*b* is increased. However, this is not the case for edges 103*e* and 103*f*. Therefore, edge 103*b* has the highest score and is selected as the next edge in the sequence. Edge 103*b* then becomes the incoming edge and vertex 104*b* becomes the current vertex.

Since edges 103*a* and 103*b* are non-collinear, the construction of the sequence of edges may stop and the plane defined by edges 103*a* and 103*b* may be provided as a candidate splitting plane, which is well-fitted to an intersection loop of the volume 100 delimiting two less-concave sub-volumes. Alternatively, the construction of the sequence of edges may continue until the sequence forms a closed loop.

In this case, at vertex 104*b*, there are three outgoing edges, including edge 103*c*. None of the outgoing edges are concave (they are all convex); therefore, none of them are immediately selected as the next edge, but rather a score for each outgoing edge is calculated. In a first stage, considering the configuration at the end vertex of each outgoing edge, edge 103*c* leads to convex hyperbolic vertex 104*c*, whereas the two other outgoing edges lead to convex vertices. Furthermore, the end vertex 104*c* is adjacent to a concavity leading away from the start vertex 104b, namely, the concavity lying adjacent to edge 103d. Thus, in the first stage, the score for edge 103c is increased, but not the score for the two other outgoing edges. In a second stage, considering the configuration at the start vertex 104b, the start vertex 104b is not convex hyperbolic. Thus, in the second stage, none of the scores of the outgoing edges are increased. As a result, edge 103c has the highest score and is selected as the next edge in the sequence. Edge 103c then becomes the incoming edge and vertex 104c becomes the current vertex.

At vertex 104c, there are five outgoing edges, including edge 103d. As edge 103d is the only concave one of the outgoing edges, it is immediately selected as the next edge in the sequence. Edge 103d then becomes the incoming edge and vertex 104d the current vertex.

Thus a sequence comprising edges 103a, 103b, 103c and 103d may be constructed. In this example, the constructed sequence of edges is well fitted to an intersection loop of two sub-volumes of volume 100, and thereby provides an optimal splitting location.

Furthermore, in some embodiments, two sequences of edges may be constructed from each concave edge identified in the vicinity of the deepest voxels, each starting at a different one of the two vertices of the initial concave edge. Because the selection of the next edge in the sequence always preferably proceeds in the default order (which may be arbitrarily chosen as the clockwise or anticlockwise order), the two sequences of edges constructed from the concave edge will in general loop around different convex features of the selected volume.

Figure 10C:
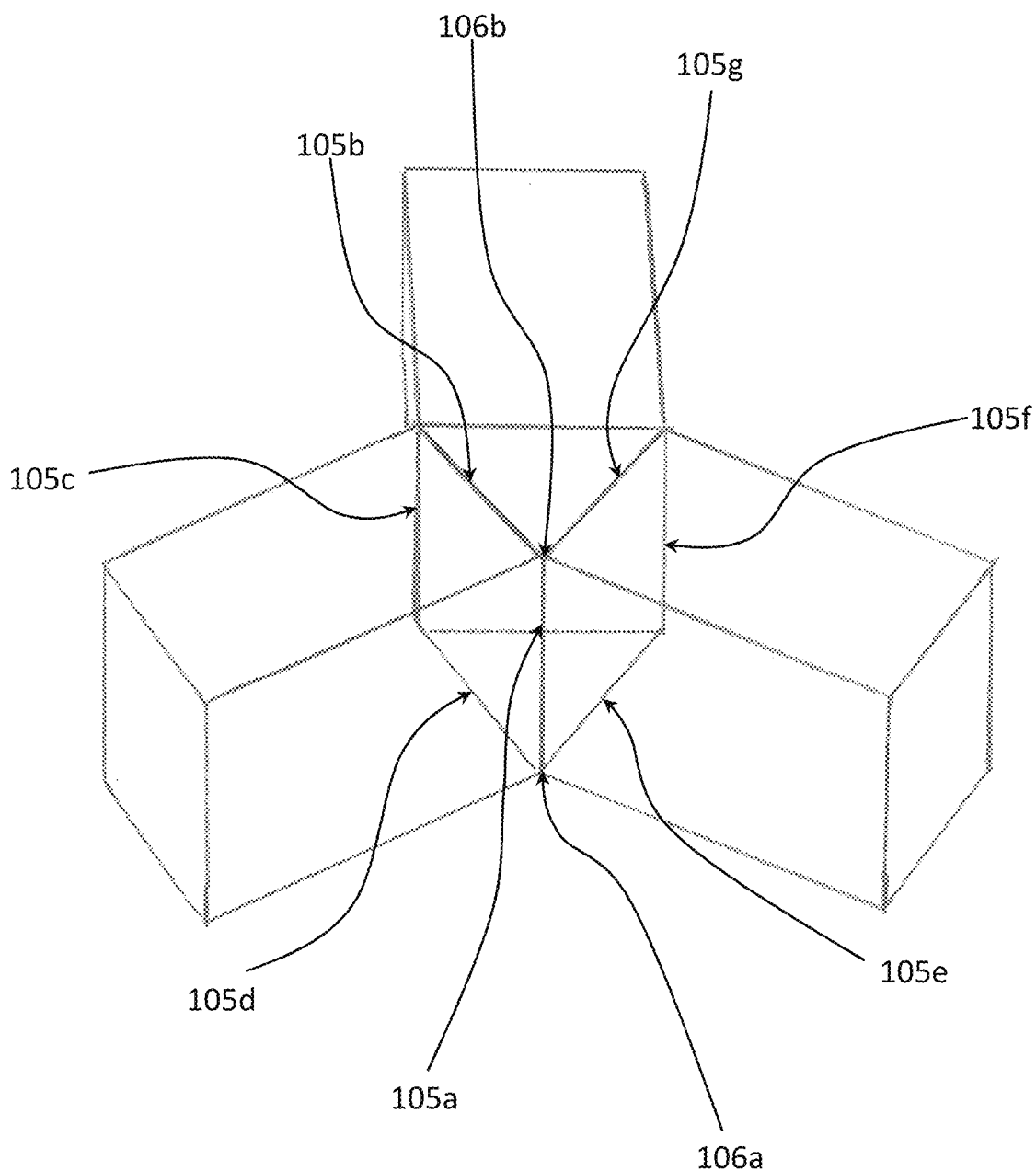
FIG. 10C depicts another example concave volume.

For example, turning to FIG. 10C, a concave volume is depicted. Assume concave edge 105a has been identified as being adjacent to a region of deepest concavity, and sequences of edges are to be constructed starting from edge 105a. Further assume that the default order for differentiating equally valid choices for the next edge is the clockwise order. Then, a first sequence of edges starting with incoming edge 105a and current vertex 106b may follow edges 105a, 105b, 105c and 105d, and may thus form a closed loop of edges isolating a first convex sub-volume from the rest of the concave volume. A second sequence starting at incoming edge 105a and current vertex 106a may follow edges 105a, 105e, 105f and 105g, thus forming a closed loop of edges isolating a second convex sub-volume from the rest of the concave volume, where the second sub-volume is different from the first. This demonstrates how consistently following a default order to differentiate equally valid choices leads to two different sequences of edges that each individually isolate a simple, most convex feature.

Candidate planes of a second type may be determined from faces of the mesh representing the selected volume in the vicinity of the deepest voxels. Each face in the vicinity of the deepest voxels may be determined to be a candidate plane. In this way, planes of faces which are not incident to concave edges may nevertheless be determined to be candidate planes, so that disconnected meshes that contain no concave edges in critical split locations may still be optimally handled.

Candidate planes of a third type may be determined from concave edges in the vicinity of the deepest voxels. For each identified concave edge, a plane which halves the angle between the two faces incident to the concave edge may be determined to be a candidate plane.

Because candidate planes and closed loops of edges of the first type are generated from sequences that seek and follow concavities in the selected volume, they usually split the volume into sub-volumes with a lower concavity than candidate planes of the second and third type in regions of manifold geometry where they can be generated. Thus, it may first be attempted to generate candidate planes of the first and second types and/or closed loops of edges of the first type, and planes of the third type may be generated only if none of the candidate planes of the first and second types split the volume non-trivially.

At step S1444, the selected volume is split along a candidate splitting plane or candidate splitting intersection loop which minimizes an error metric, to obtain two or more child volumes.

In particular, when multiple candidate planes or candidate intersection loops are available for a volume, an error metric is evaluated for each plane or intersection loop in turn, and the plane or intersection loop with lowest error is chosen to split the selected volume. The aim of the error metric is to favor planes and/or intersection loops which produce child volumes that are well-approximated by their convex hulls. To this end, the error metric for a plane or intersection loop may be defined as the sum of the volumes of the convex hulls of the child volumes that would be created by the split.

Figure 11:
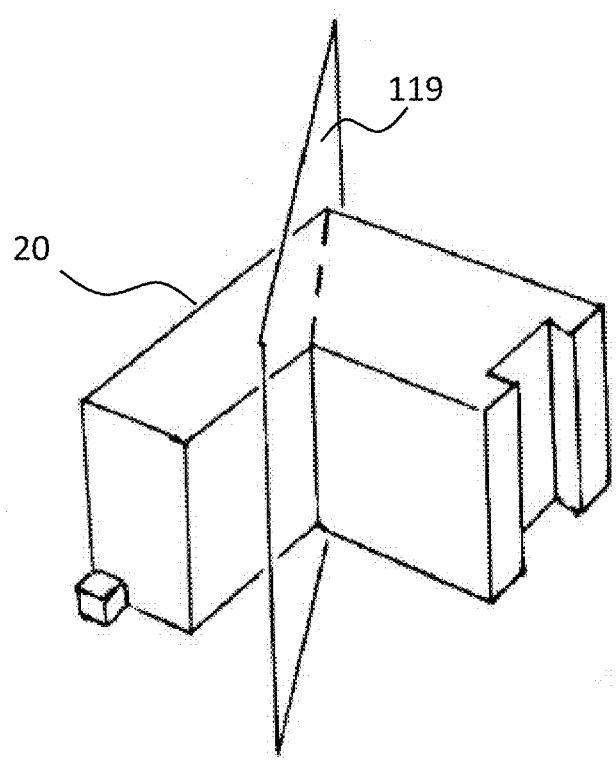
FIG. 11 depicts an example candidate splitting plane on the example volume of FIG. 2 according to embodiments of the present specification.

For example, FIG. 11 depicts a candidate plane 119 which splits the example three-dimensional volume 20 in a way that minimizes such an error metric.

Alternatively, the error metric used could also be the maximum of the overhang metrics for the child volumes that would be created by the split. However, the sum of the volumes of the convex hulls of the child volumes is computationally cheaper to calculate than the overhang or the generalized overhang of each child volume, and so may be preferable at this stage given the potentially large number of candidate planes that may be generated.

Computing the error metric for a candidate plane or intersection loop involves using the plane or intersection loop to split the mesh representing the volume and then building the convex hulls of the resultant mesh segments. This process may be optimized by not computing the triangles of the mesh segments and instead just computing the points of the mesh segments, as the convex hull of a mesh is identical to the convex hull of its vertices. When splitting with a plane, the points of the mesh segments include any vertices that lie outside the plane, plus a set of new points created where edges of the existing triangles cross the plane.

Because candidate planes and/or intersection loops are only generated in the vicinity of the deepest voxels, the set of candidate planes and/or intersection loops is typically small enough that calculating the error metric for each candidate plane is computationally feasible. The error metric constitutes a score for the candidate plane or intersection loop. The candidate plane or intersection loop with the lowest error metric (the best score) is chosen or selected as the candidate plane or intersection loop by which to split the selected volume. Put another way, the method scores each of multiple candidate splitting planes or candidate splitting intersection loops and selects as the splitting plane or the splitting intersection loop a candidate splitting plane or candidate splitting intersection loop that has the best score.

The selected volume is then split by the chosen plane or intersection loop, forming two child volumes, one inside the plane and the other outside it. For example, if the selected volume is represented by a mesh, the mesh may be split by the plane or intersection loop, forming two or more mesh segments each of which represents a child volume.

Splitting a mesh with a plane may be done by means of a simple triangle clipping algorithm that clips each triangle of the mesh in turn. When a triangle is clipped by a plane, it is either not clipped at all (if all of its vertices are outside the plane), clipped away entirely (if all of its vertices are inside), or else clipped non-trivially. When a triangle is clipped non-trivially, the remaining clipped face is either a triangle or a convex quadrilateral. Any convex quadrilateral may then be triangulated arbitrarily to ensure the new fragment contains only triangles.

Splitting a mesh at an intersection loop involves splitting each face intersected by the intersection loop into two faces separated by an edge, such that each point on the intersection loop falls on an edge, followed by surgically unwelding the mesh at the edges which coincide with the intersection loop. In particular, if the intersection loop was generated as a closed loop of edges such as was described at step S1443, splitting the mesh at the intersection loop does not produce any new vertices, edges and faces, helping to keep the complexity of the volumes low.

In practice, clipping a volume by a plane or an intersection loop may be achieved simply by discarding the features of the volume on one side of the plane or intersection loop. Therefore, in some embodiments, a mesh may be split by creating two copies of the mesh, and then clipping each copy with the plane or intersection loop, where each clip retains the features of the volume on a different side of the plane or intersection loop, thus producing the two child volumes.

The mesh segments then each define a new child volume. The mesh segments need not be generally closed. Indeed, each mesh segment may be open on the sides where it has been clipped.

Figure 12:
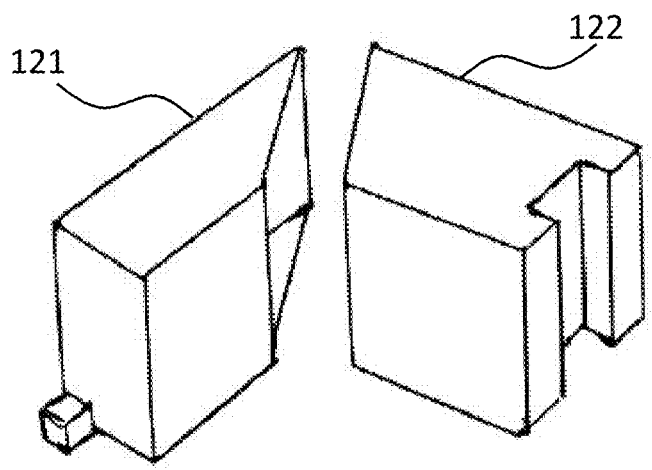
FIG. 12 depicts an example split of the example volume of FIG. 2 into two three-dimensional volumes according to embodiments of the present specification.

For example, FIG. 12 depicts the result of splitting the example three-dimensional volume of FIG. 2 by the splitting plane 119 of FIG. 11. The split creates two mesh segments 121 and 122. The mesh segments 121 and 122 are not closed manifolds; rather, they are open where they were clipped by the splitting plane.

This may be resolved by capping the clipped fragments where they are clipped, but this is only trivial in areas where the original fragment is a closed two-manifold. For example, if the selected volume is split at an intersection loop of the first type identified as described above, each resulting mesh segment may be capped in such a way that the mesh segments are both locally convex in the regions of capping. This may lead to mesh segments which overlap, without adverse consequences.

However, surprisingly, capping is not needed when splitting with a plane. Although the resulting mesh segments may be open where they were clipped, this does not negatively affect their hulls, as long as the selected volume is clipped with a plane, which is a convex primitive. The resulting mesh segments, together with the voxelized representation of the input volume, are sufficient to completely define the child volumes.

In some embodiments, splits that produce marginal, degenerate or empty volumes as results may be handled specially. When each child volume is built, it may be discarded if it is marginal in size, which may be determined by checking whether the volume of its convex hull mesh is below a minimum threshold. Furthermore, any volumes for which no interesting splitting plane or intersection loop can be found may be rejected as split candidates. Such volumes may be either accepted as-is or discarded entirely, depending for example on whether the voxels within their convex hulls are at least half-filled.

At step S1450, the selected volume is replaced in the transformed set of volumes by the two child volumes created by the split. In particular, if the selected volume is popped from the priority queue at step S1430, then the measure of concavity may be computed for both child volumes and the child volumes may be inserted on the priority queue.

At step S1460, it is determined whether the measure of concavity of all the volumes in the transformed set of volumes is less than or equal to a tolerance, which may be predetermined or user-specified. For example, the condition may be that the overhang metric of each volume in the transformed set of volumes is less than or equal to a tolerance of zero, in other words, that each volume in the transformed set of volumes be convex. Setting a higher tolerance relaxes the requirements on the transformed set of volumes and causes the splitting stage to complete more quickly, at the expense that the volumes of the transformed set of volumes may be less close to convex.

If the concavity of one of the volumes in the transformed set of volumes is greater than the tolerance, then the splitting stage continues by performing steps S1420-S1460 again: a volume of the transformed set of volumes is newly selected for splitting and split along a splitting plane or splitting intersection loop. Because of this iterative process, each volume of the input set may be split several times along different splitting planes and/or splitting intersection loops, thus allowing complex volumes to be iteratively decomposed into convex or roughly-convex volumes.

If the concavities of all the volumes in the transformed set of volumes are less than the tolerance, then the method proceeds to the merging stage at step S1500.

Additionally or alternatively, the stopping criterion for the splitting stage may comprise constraints adapted to the limitations of the computational environment, such as an upper limit on the number of volumes in the transformed set of volumes. For example, splitting may stop when a threshold number of volumes in the transformed set of volumes is exceeded, regardless of the maximum concavity of any volume in the transformed set of volumes.

With reference to FIGS. 13-16, a second iteration through the splitting stage is described, after the example volume of FIG. 2 has already been split once as described above. At the beginning of the second iteration of splitting, the transformed set of volumes comprises two volumes represented by the meshes 121 and 122 of FIG. 12. The second iteration of splitting proceeds through steps S1420-1460 again, though now on the new transformed set of volumes that comprises meshes 121 and 122 of FIG. 12.

Figure 13:
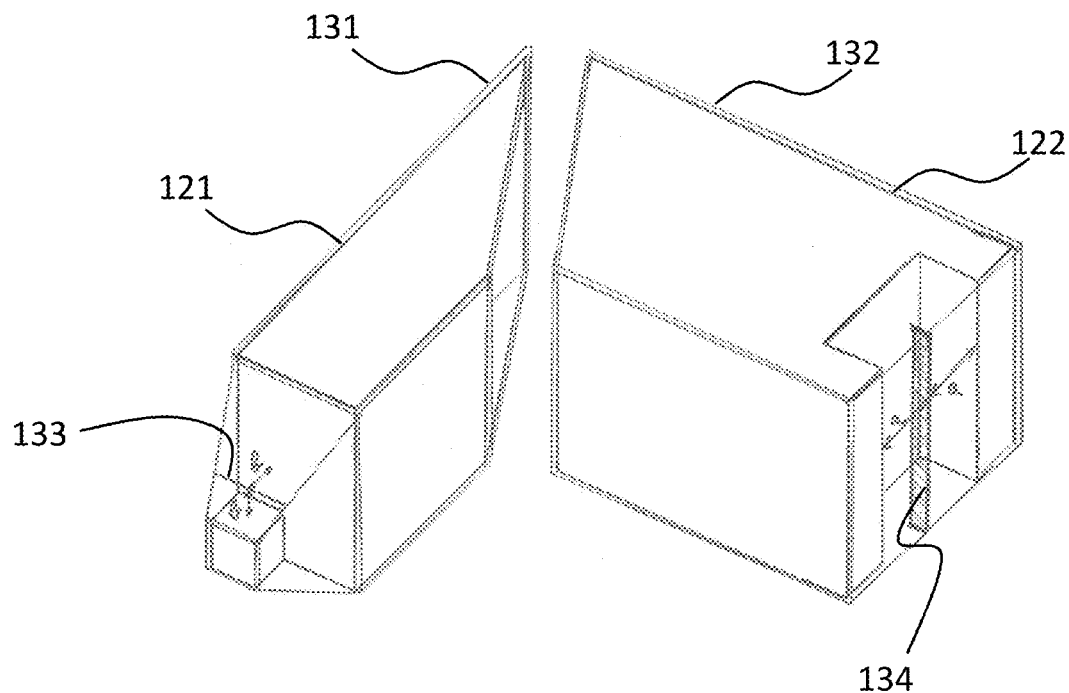
FIG. 13 illustrates the measure of concavity of FIG. 6 on the two volumes obtained by the split depicted in FIG. 12 produced according to embodiments of the present specification.

Turning to FIG. 13, example steps S1420-1430 of the second iteration of splitting is illustrated. FIG. 13 depicts meshes 121 and 122 which represent the transformed set of volumes. At step S1420 of the second iteration of splitting, the convex hull of each volume in the transformed set of volumes is computed. The convex hull of meshes 121 and 122 are depicted respectively as convex hull 131 and 132. The hull overhang of each convex hull 131 and 132 is then computed, using the voxel representation 40 of the one or more input volumes of FIG. 4. Notably, the single voxel representation 40 and the convex hulls 131 and 132 are sufficient to compute the overhang of each hull 131 and 132; in particular, it is not necessary to maintain a separate voxel representation for each individual convex hull in order to compute overhang, enabling memory savings to be achieved. The hull overhang of convex hull 132 is shown on FIG. 13 as the distance a, attained in the region 134. The hull overhang of convex hull 131 is shown as the distance b, attained in the region 133. Since a is greater than b, convex hull 132 has greater overhang than convex hull 131. As a result, at step S1430 of the second iteration of splitting, the volume represented by mesh 122 is selected for splitting.

Figure 14:
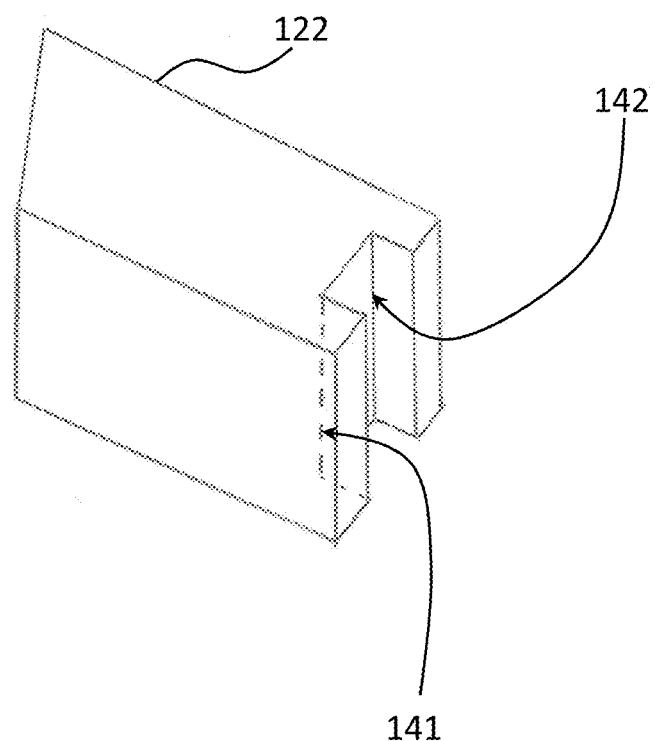
FIG. 14 depicts concave edges of one of the two volumes obtained by the split depicted in FIG. 12 produced according to embodiments of the present specification.

Turning to FIG. 14, the two deepest concavities of the volume represented by mesh 122 are shown, labelled 141 and 142.

Turning to FIG. 15, an example step S1441-1443 of the second iteration of splitting is illustrated. A splitting plane 151 through one of the deepest concavities is determined, for example as described above with reference to steps S1441-1443.

Turning to FIG. 16, an example step S1444 of the second iteration of splitting is illustrated. The volume represented by mesh 122 is split along the splitting plane 151 of FIG. 15, by splitting mesh 122 along the splitting plane 151. This results in two meshes 161 and 162, each representing a new volume. The volumes 161 and 162 then replace the volume 121 in the transformed set of volumes at step S1450.

Once the splitting stage has completed, all volumes in the transformed set of volumes are thus sufficiently well approximated by their convex hulls, to within some user-specified tolerance. The aim of splitting is to ensure that large non-convex volumes are broken up into roughly convex parts, i.e. volumes that are convex or only slightly concave. The volumes in the transformed set of volumes may thus be provided as output by the method advancing directly to step S1700, or, alternatively, the method may continue directly to the simplification stage at step S1600.

However, at the end of the splitting stage, the total number of volumes in the transformed set of volumes may be arbitrarily large, and in particular higher than an allowed number of volumes.

Typically, the computational cost of performing physics simulation, such as collision detection, increases at least linearly with the number of volumes, and often non-linearly. For example, if a first object consists of 10 volumes, and a second object consists of 10 volumes, a collision detection may take up to 10×10=100 volume-versus-volume collision detection operations to detect and analyze potential collisions between them.

As a result, the potentially large number of volumes obtained at the end of the splitting stage may cause inefficiencies in processes operating on the transformed set of volumes.

Furthermore, the number of volumes in the transformed set of volumes can often be reduced at little or no accuracy loss. This may for example be the case if the input volumes comprise a few large and complex volumes and several small volumes representing detailed features of objects. After splitting the large volumes, the small volumes can often be grouped with some of the child volumes obtained at the splitting stage.

For these reasons, the method 1000 may advance to the merging stage at step S1500 where pairs of volumes are iteratively merged, enabling the number of volumes to be reduced, while attempting to ensure that the transformed set of volumes continues to accurately approximate the input volumes. A merging stage may be performed subsequently to the splitting stage, or alternatively, multiple merging and splitting stages may be interleaved to reduce the memory used to store the transformed set of volumes. For example, a first splitting stage may be performed, then a first merging stage, then a second splitting stage, then a second merging stage, where the parameters of each splitting and merging stage are different.

Figure 17:
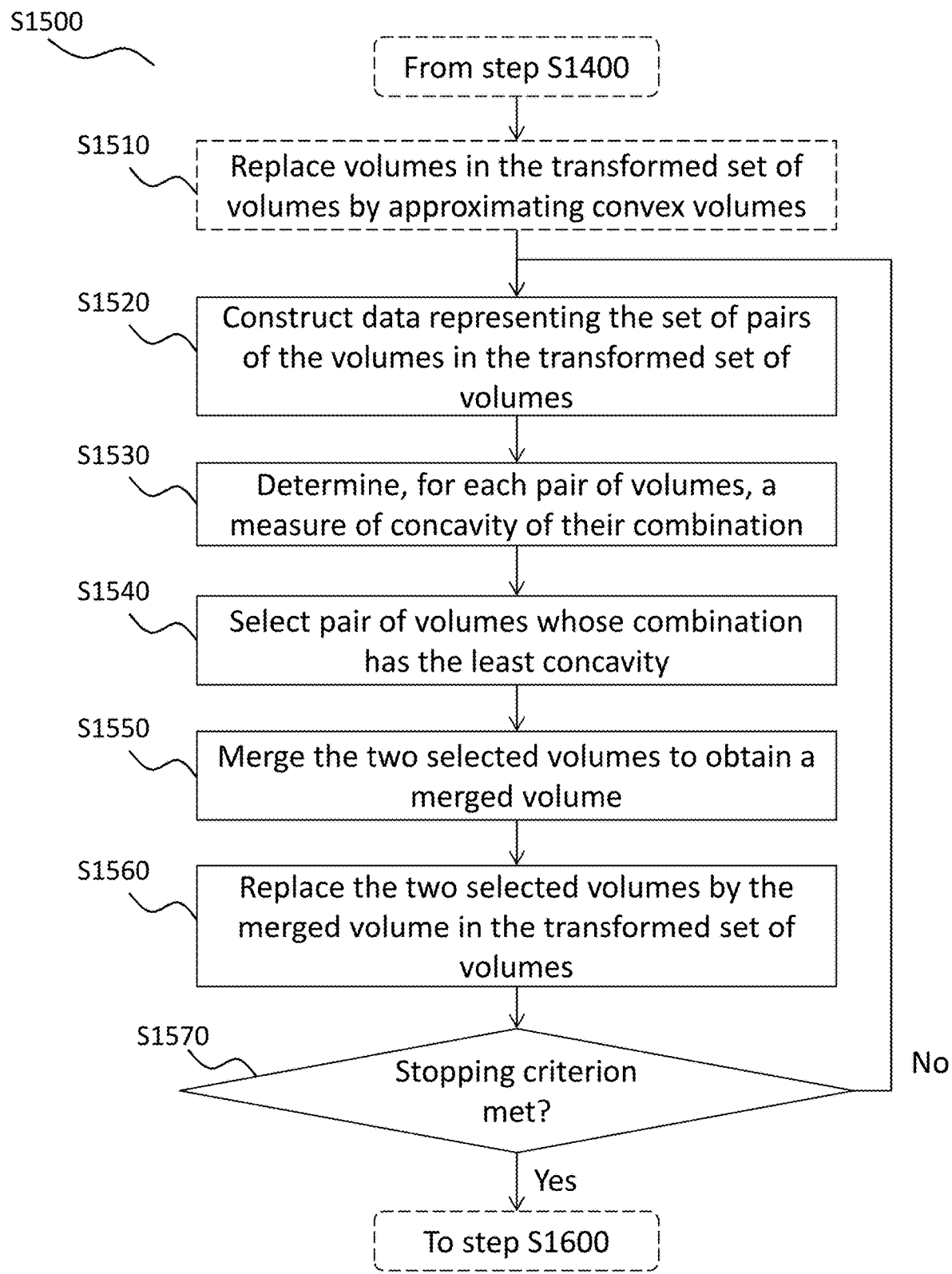
FIG. 17 shows an example method for merging three-dimensional volumes according to embodiments of the present specification.

At step S1500, volumes in the transformed set of volumes may be merged to reduce the number of volumes in the transformed set of volumes, while attempting to keep the maximum concavity of any volume in the transformed set of volumes as low as possible. Broadly speaking, the merging stage takes as input the transformed set of volumes resulting from splitting, and merges one or more sub-sets of the transformed set of volumes into single volumes. In particular, the merging stage may iteratively merge a pair of volumes at a time. Having constructed a set of pairs of volumes, the best pair may be repeatedly taken from the set, the two volumes of the pair may be merged, and the two volumes may be replaced by the result of merging them in the set of transformed volumes. The merging may stop when the number of volumes is within a user-specified limit and the overhang metric of the volume created by the next merge is greater than a user-specified tolerance, within which merging is considered free. The various steps involved are explained in more detail with reference to FIG. 17 as steps S1510-S1570.

Optionally, at step S1520, each volume in the transformed set of volumes may be convexified, that is, replaced by an approximating convex volume. In particular, one or more volumes may be each replaced by their convex hull. For example, if a volume is represented by a mesh, the volume may be replaced by the convex hull of the mesh. This may have the effect of simplifying the volumes: for example, replacing a volume by its convex hull causes any features of the volume which are wholly comprised within the convex hull to be discarded, thereby simplifying the volume.

Notably, replacing the volumes by their convex hulls at step S1510 does not cause any change to the geometry of the output hulls, compared to replacing the volumes at the end of the merging stage by their convex hulls. As a result, if it is desired that the volumes output by the method be convex, step S1510 may enable a significant computational saving to be achieved throughout the merging stage by reducing the complexity of volumes at the outset, with no ultimate accuracy loss.

At step S1520, data representing the set of pairs of volumes of the transformed set of volumes is constructed. This data may be in the form of a priority queue, where each item on the queue represents a single pair of volumes. For example, each item on the queue may be a pair of meshes where each mesh represents a volume of the transformed set of volumes.

In some embodiments, unpromising pairs may be eliminated from the set of pairs of volumes before computing their convex hull or computing a concavity metric for their combination. For example, pairs of volumes which are situated at least a certain threshold distance apart may be removed outright, as their combination is unlikely to have the least concavity of all pairs. Additionally or alternatively, a hierarchical spatial search may be used to eliminate pairs of volumes whose combination has a high measure of concavity. The most promising pairs returned by the search may then be used as the pairs of volumes of the transformed set of volumes at step S1520. By reducing the number of pairs considered, a significant computational saving may be achieved, notably at step S1530 where a measure of concavity of the combination of the volumes of the pair is determined for each pair in the data representing the set of pairs.

At step S1530, for each pair of volumes, a measure of concavity of their combination is determined. The pairs of volumes may then be ordered on the priority queue by the measure of concavity.

For example, the measure of concavity of the combination of two or more volumes may be the concavity of a volume that would be obtained if the two or more volumes were merged, where the same concavity metric may be used as in the splitting stage. In particular, the measure of concavity of the combination of two or more volumes may be the overhang metric of the convex hull of the union of the two or more volumes.

Thus, to determine the measure of concavity of the combination of the two volumes of each pair of volumes, a convex hull may be constructed for every pair of volumes and the concavity of each convex hull may be calculated, as described above in relation to step S1420. Eliminating unpromising pairs of volumes at step S1520 above reduces the computational complexity of this step.

Advantageously, if each volume in the transformed set of volumes is represented by a mesh, the convex hull of the union of two volumes in a pair can be constructed directly as the convex hull of the vertices of the two meshes representing the two volumes. The two meshes need not be first welded together, providing a significant computational saving. For this reason, the convex hull of the union of two volumes in a pair does not change if each volume is replaced by its convex hull as in step S1510.

At step S1540, the pair of volumes whose combination has the least concavity is selected for merging.

Figure 18:
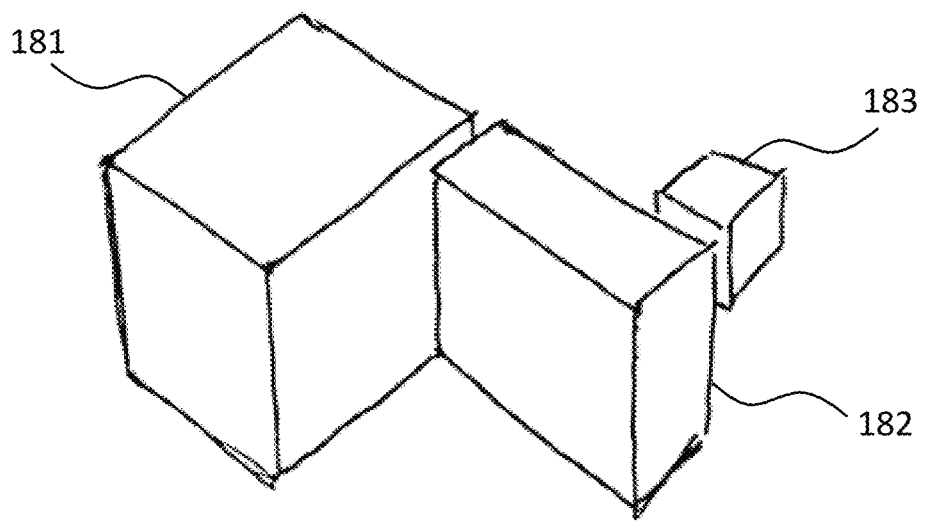
FIG. 18 shows three example three-dimensional volumes.

By selecting volumes whose combination has least concavity, volumes which are spatially close are selected, whose combination approximates the input volumes more accurately. For example, the convex hull of a combination of two volumes which are located far apart spans the region of space between them, with significant overhang. This is illustrated in FIG. 18, which depicts three example three-dimensional volumes 181, 182 and 183. The convex hull of the combination of volumes 182 and 183 has smaller overhang than the alternative hulls of the combination of volumes 181 and 182 or volumes 181 and 183. Thus, if the merging stage was to merge two of the three volumes 181, 182 and 183 on the basis of minimizing the overhang of their combination, volumes 182 and 183 would be merged.

At step S1550, the two selected volumes, that is, the volumes of the selected pair of volumes, are merged to obtain a merged volume.

The merged volume may be an approximating convex volume of the volume formed by the union of the two volumes. For example, the merged volume may be the convex hull of the combination of the two volumes, as obtained at step S1540. In this way, the merged volume is assured to be the smallest convex shape that comprises both selected volumes, that is, an optimal convex approximation of the two selected volumes.

Alternatively, the two selected volumes may be merged in some other way, such as by providing as the merged volume the union of the two volumes. For example, if the volumes are represented as meshes, the meshes corresponding to the two selected volumes may be welded together to represent a merged volume—for example the meshes may simply be concatenated into a single mesh. In another example, if the volumes are represented as sets of voxels, the merged volume may be represented by the union of the sets of voxels corresponding to the two selected volumes.

At step S1560, the two selected volumes are replaced by the merged volume in the transformed set of volumes. That is, the two selected volumes are removed from the transformed set of volumes, and the merged volume is inserted in the transformed set of volumes.

Since the selected volumes no longer exist individually, any pairs comprising a selected volume may be removed from the set of pairs of volumes. Furthermore, new pairs of volumes comprising the merged volume and another volume may be added to the set of pairs of volumes.

At step S1570, a stopping criterion is evaluated to determine whether to commence another round of merging or not.

The stopping criterion may include the number of volumes in the transformed set of volumes being less than a threshold, where the threshold may be predetermined or user-defined. This threshold represents an upper bound to the number of volumes that the method may produce as output. A lower threshold will lead to the method outputting fewer volumes, which may have computational benefits, at the cost of the volumes being potentially more complex and approximating the input volumes less accurately. A higher threshold will lead to the merging stage completing more quickly and the method outputting more volumes.

The stopping criterion may also include that for any pair of volumes, the concavity of their combination is above a tolerance, which may be predetermined or user-defined. While there exists a pair of volumes whose combination has concavity less than the tolerance, they may be merged in order to reap the computational benefits of reducing the number of volumes described above, at a small accuracy cost.

If it is determined that the stopping criterion is not met, the merging stage may continue: steps S1510 through S1560 may be performed again. Merging volumes iteratively provides much flexibility in the way the volumes produced by the splitting stage are combined.

If however it is determined that the stopping criterion is met, the merging may stop and operation of the method may continue to step S1600 where the volumes obtained at the end of the merging stage may be simplified. Alternatively, the method may continue directly to step S1700 to provide the volumes obtained at the end of the merging stage as output.

For example, the stopping criterion may be that the number of volumes in the transformed set of volumes is less than the threshold, and that for any pair of volumes, the concavity of their combination is greater than the tolerance. Thus, as long as the number of volumes in the transformed set of volumes is greater than the threshold and there exists a pair of volumes such that the concavity of their combination is less than the tolerance, the merging stage goes on to a new round of merging; otherwise, the merging stage is complete.

After the merging stage has completed, the number of volumes is known to be within the maximum volume limit provided by the artist. However individual volumes may still be arbitrarily complex, since their complexity depends on the complexity of the input mesh fragments they approximate. As pairs of volumes are merged in the merging stage, the convex hulls of the volumes become more complex as they come to represent bigger mesh fragments.

At step S1600, each volume in the transformed set of volumes may be simplified, in order to bring the volumes in line with a user-specified complexity limit. For example, the complexity limit may be a maximum vertex count per hull. Alternatively, the complexity limit may be specified as a geometric tolerance on hull fidelity.

Figure 19:
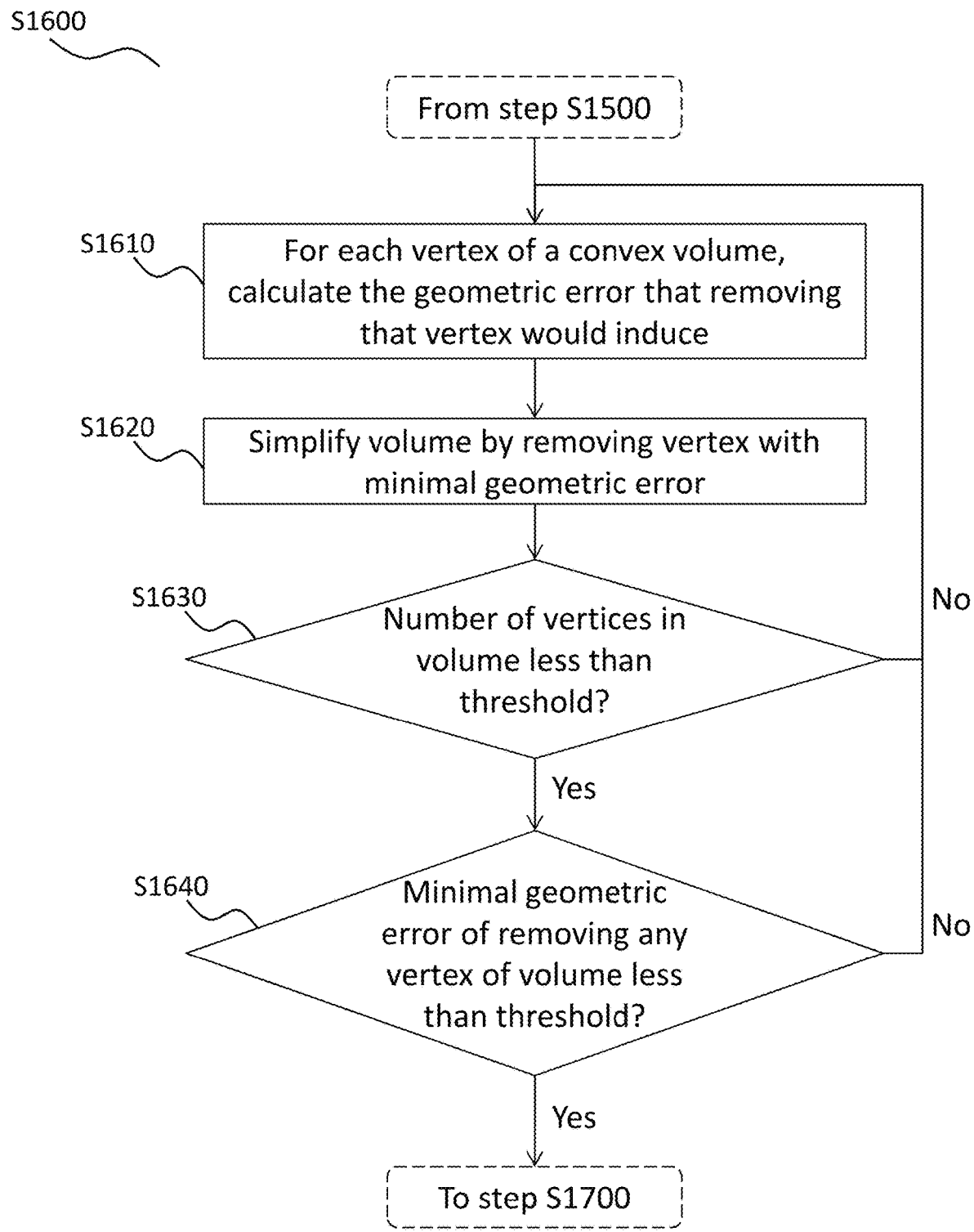
FIG. 19 shows an example method for simplifying three-dimensional volumes according to embodiments of the present specification.

Step S1600 is explained in more detail with reference to FIG. 19 as steps S1610-1640, which describe the procedure for simplifying a single convex volume by iteratively removing single vertices from the volume. For example, steps S1610-1640 may be performed on all the volumes of the transformed set of volumes that are convex.

Each volume of the transformed set of volumes may be alternatively simplified by any suitable technique which reduces the complexity of a volume, such as the number of vertices of a mesh representing the volume.

At step S1610, for each vertex of a convex volume, the geometric error that removing that vertex would induce is calculated.

Removing a vertex amounts to deleting the hull faces incident to the vertex, deleting the vertex in question, and then re-tessellating the open boundary created by the deletion of the incident faces. The circular boundary is tessellated with a simple triangulation. However in general the boundary may be non-planar, so the triangulation may be chosen to create triangles that maintain convexity.

When picking vertices for removal, the aim is to remove the least important, or least "feature", hull vertex in each step. To this end, a priority queue of the remaining vertices may be constructed, ordered by ascending value of removal cost metric.

The removal cost of a vertex estimates the geometric error introduced by removing that vertex. Given a candidate vertex v, a simple error metric might measure, for each vertex w in its one-ring, the maximum distance of w below any of the planes of the faces incident to v. The geometric error associated with removing v is then just the minimum of the maximum distances of the vertices in the one-ring. In this way, vertices are cheap to remove if their incident triangles are nearly co-planar, and more expensive to remove if their incident triangles form a convex feature.

At step S1620, the volume is then simplified by removing the vertex with the least geometric error.

Figure 20:
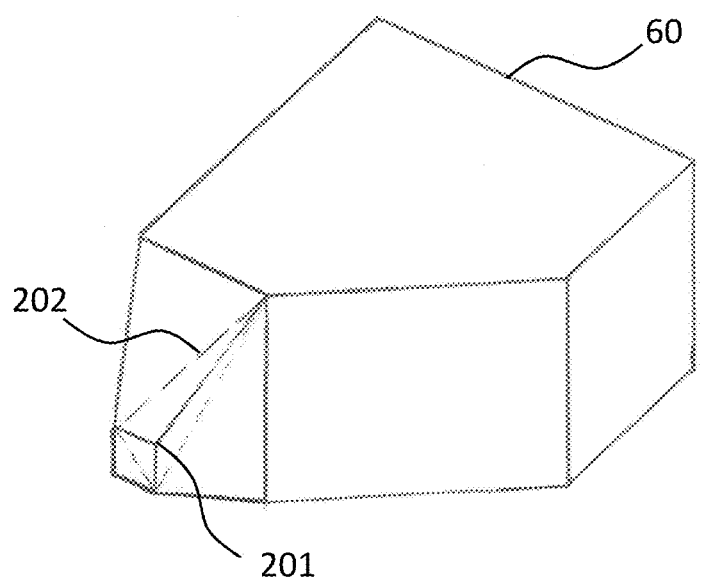
FIG. 20 shows the convex hull of FIG. 6 after an example round of simplification, according to embodiments of the present specification.

This is illustrated in FIG. 20. The thick line represents the convex hull 60 of FIG. 6. The vertex with least associated geometric error is vertex 201. Performing a round of simplification on the convex hull 60 would therefore result in the vertex 201 being removed, and the opening re-tessellated accordingly. For example, the faces surrounding vertex 201 would be removed and the dashed line triangle 202 would be created.

At steps 1630 and 1640, a stopping criterion is evaluated to determine whether or not to continue simplification.

The stopping criterion may include that the number of vertices in the volume is less than or equal to a threshold, where the threshold effectively sets an upper bound on the allowed complexity of the volume.

The stopping criterion may further include that the minimal geometric error of removing any vertex of the volume is greater than a tolerance. Below the tolerance, simplification may be considered free, and the simplification may continue even if the number of vertices in the volume is already within the allowed upper bound.

If the stopping criterion is not met, another round of simplification ensues. Otherwise, the method advances to step S1700.

At step S1700, the method provides data representing the transformed set of volumes. For example, if the transformed set of volumes was represented by a set of polygonal meshes, the method may output the set of polygonal meshes. After step S1700, the method ends.

The results provided by the method are now described with reference to FIGS. 21 and 22.

Figure 21:
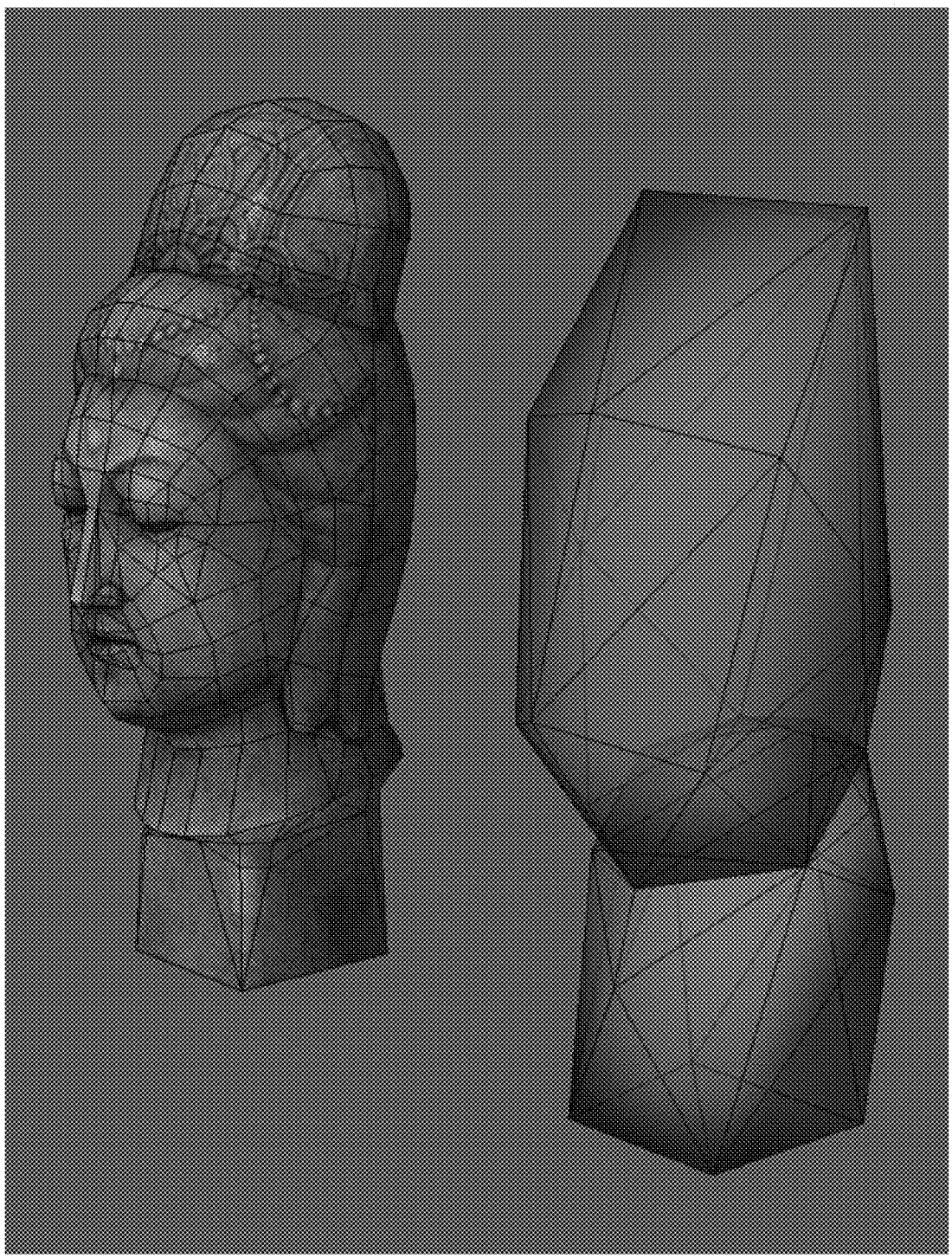
FIG. 21 shows an example three-dimensional volume and its decomposition into convex volumes by the method described with reference to FIG. 1 according to embodiments of the present specification.

FIG. 21 illustrates, on the left, a polygon mesh representing a Buddha head. Processing this mesh by an example method 1000 may result in two convex volumes each represented by a triangular mesh, as shown on the right. The resulting convex volumes are well-adapted for physics simulations purposes such as collision detection.

Figure 22:
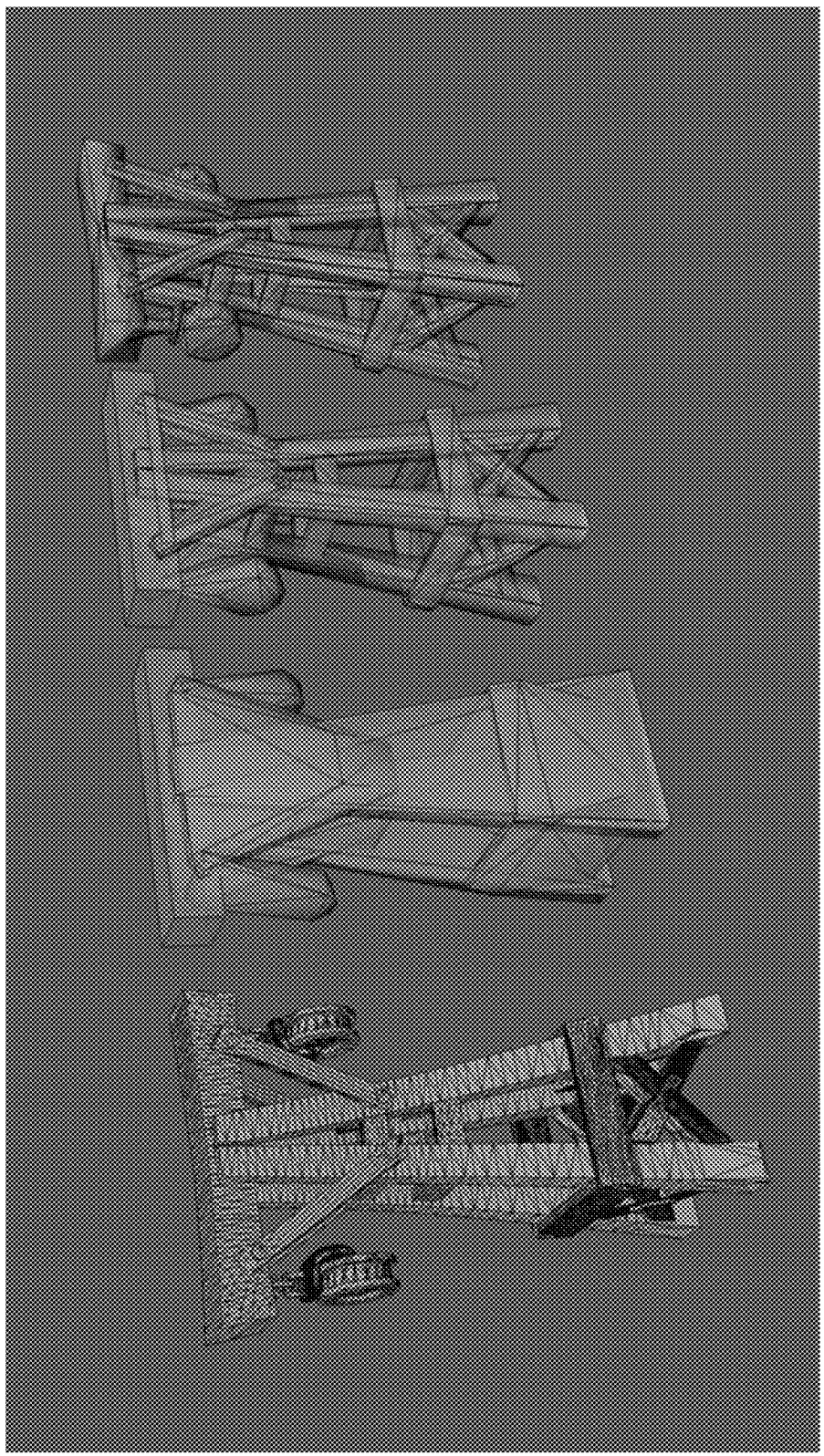
FIG. 22 shows another example three-dimensional volume and its decomposition into convex volumes by the method described with reference to FIG. 1 according to embodiments of the present specification, at varying levels of detail.

Turning to FIG. 22, the effect of the different threshold settings described above is demonstrated. On the left, an original triangular mesh is shown representing a three-dimensional object. Setting a low limit on the number of allowable volumes and the allowable volume complexity causes an example method 1000 to generate a coarse decomposition, as shown in the second mesh from left. Setting a medium limit on the number of allowable volumes and the allowable volume complexity causes an example method 1000 to generate a finer decomposition, as shown on the third mesh from left. Setting a high limit on the number of allowable volumes and the allowable volume complexity causes an example method 1000 to generate an even finer decomposition, as shown in the rightmost mesh. Each of these meshes may be useful in different physics simulation contexts, depending on the computational resources available to perform the physics simulation. Thus, by setting the values of the various threshold settings, notably the maximum number of volumes to be output and the maximum volume complexity, the output of an example method 1000 may be adapted to suit the constraints of the particular application.

Figure 23:
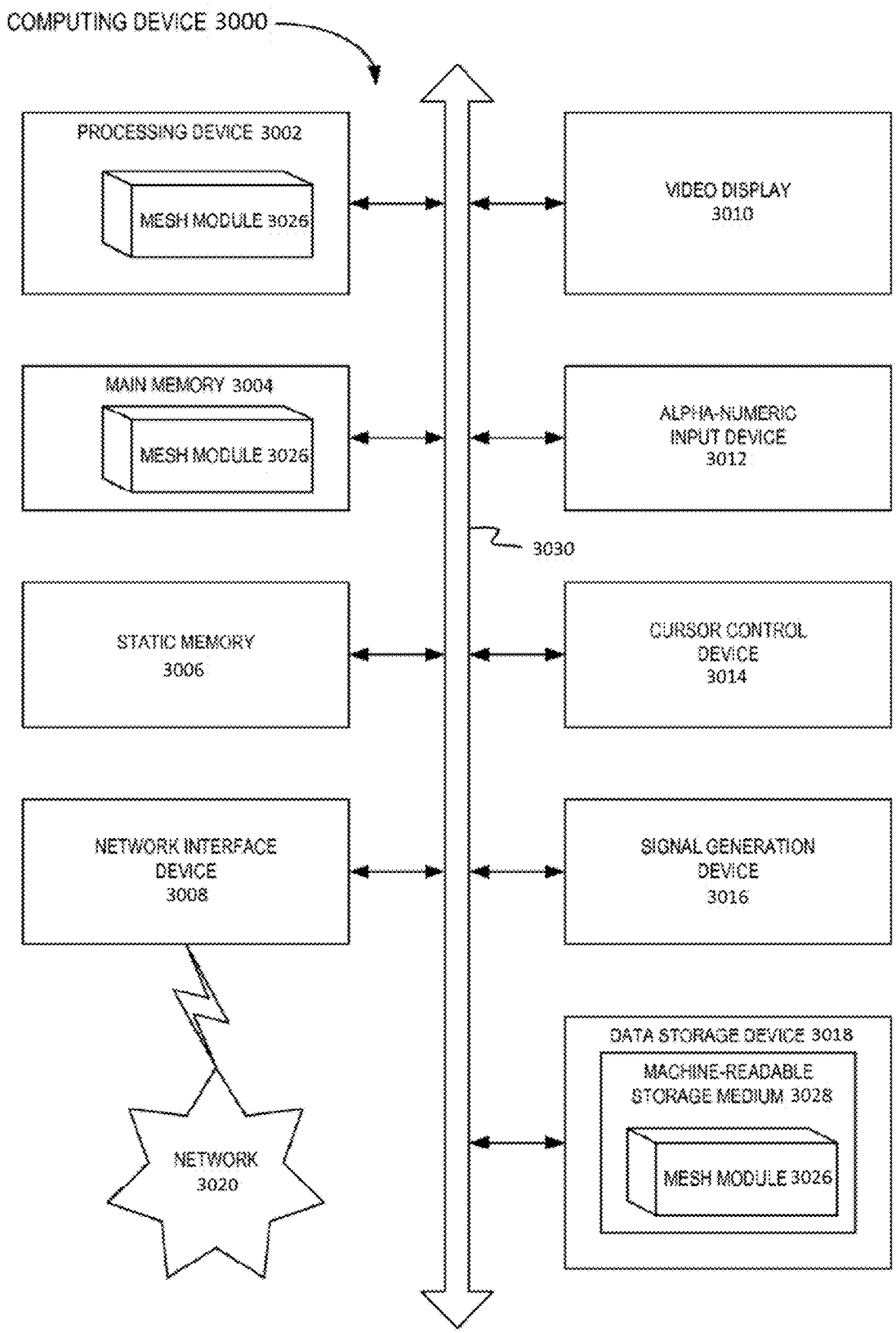
FIG. 23 is an illustration of a computing device for performing processes according to embodiments of the present specification.

FIG. 23 illustrates a diagrammatic representation of a computing device 3000 within which a set of instructions, for causing the machine to perform any one or more of the methodologies discussed herein, may be executed. The computing device 3000 may be a computing device (e.g., a server computer) within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 3000 includes a processing device (e.g., a processor) 3002, a main memory 3004 (e.g., read-only memory (ROM), flash memory, dynamic random access memory (DRAM) such as synchronous DRAM (SDRAM)), a static memory 3006 (e.g., flash memory, static random access memory (SRAM)) and a data storage device 3018, which communicate with each other via a bus 3030.

Processing device 3002 represents one or more general-purpose processing devices such as a microprocessor, central processing unit, or the like. More particularly, the processing device 3002 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 3002 may also be one or more special-purpose processing devices such as an application specific integrated circuit (ASIC), a field programmable gate array (FPGA), a digital signal processor (DSP), network processor, or the like. The processing device 3002 is configured to execute mesh module 3026 for performing the operations and steps discussed herein.

The computing device 3000 may further include a network interface device 3008 which may communicate with a network 3020. The computing device 3000 also may include a video display unit 3010 (e.g., a liquid crystal display (LCD) or a cathode ray tube (CRT)), an alphanumeric input device 3012 (e.g., a keyboard), a cursor control device 3014 (e.g., a mouse) and a signal generation device 3016 (e.g., a speaker). In one embodiment, the video display unit 3010, the alphanumeric input device 3012, and the cursor control device 3014 may be combined into a single component or device (e.g., an LCD touch screen).

The data storage device 3018 may include a computer-readable storage medium 3028 on which is stored one or more sets of instructions (e.g., instructions of simplification module 3026) embodying any one or more of the methodologies or functions described herein. The simplification module 3026 may also reside, completely or at least partially, within the main memory 3004 and/or within the processing device 3002 during execution thereof by the computing device 3000, the main memory 3004 and the processing device 3002 also constituting computer-readable media. The instructions may further be transmitted or received over a network 3020 via the network interface device 3008.

While the computer-readable storage medium 3028 is shown in an example embodiment to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media.

In the above description, numerous details are set forth. It will be apparent, however, to one of ordinary skill in the art having the benefit of this disclosure that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulation of physical quantities. Usually, though not necessarily, these quantities take the form of electrical or magnetic signals capable of being stored, transferred, combined, compared and otherwise manipulated. It has been proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "identifying," "classifying," "reclassifying," "determining," "adding," "analyzing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purpose, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMS and magnetic-optical disks, read-only memories (ROMs), random access memories (RAMs), EPROMs, magnetic or optical cards, flash memory, or any type of media suitable for storing electronics instructions.

The words "example" or "exemplary" are used herein to mean serving as an example, instance, or illustration. Any aspect or design described herein as "example" or "exemplary" is not necessarily to be construed as preferred or advantageous over other aspects of designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" in intended to mean any of the natural inclusive permutations. That is, if X includes A; X includes B; or X includes both A and B, then "X includes A and B" is satisfied under any of the foregoing instances. In addition, the articles "a" and "an" as used in this specification and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinary meaning according to their numerical have an ordinal meaning according to their numerical designation.

The algorithms and displays presented herein presented herein are inherently related to any particular computer or other apparatus. Various general purpose systems may be used with programs in accordance with the teachings herein, or it may prove convenient to construct a more specialized apparatus to perform required method steps. The required structure for a variety of these systems will appear from the description. In addition, the present disclosure is not described with reference to any particular programming language. It will be appreciated that a variety of programming languages may be used to implement the teachings of the disclosure as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or method are not described in detail or are presented in simple block diagram format in order to avoid unnecessarily obscuring the present disclosure. Particular implementations may vary from these example details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. Apparatus comprising one or more processors and a memory, the memory comprising instructions that, when executed by the one or more processors, cause the apparatus to perform:
    obtaining data representing an input set of one or more three-dimensional volumes;
    selecting a first three-dimensional volume from among the input set of one or more three-dimensional volumes;
    identifying points which are outside or on a surface of the one or more three-dimensional volumes;
    calculating a depth value for each of multiple points which was determined to lie outside or on the surface of the one or more three-dimensional volumes, the depth value for a point indicating the length of the shortest non-straight path to that point from a point outside the approximating convex volume, where the path remains outside the one or more volumes; and
    using the depth values to identify a region of deepest concavity in the first three-dimensional volume;
    splitting the first three-dimensional volume along a split plane or intersection loop contacting or intersecting the region of deepest concavity, such as to provide plural three-dimensional volumes; and
    providing data representing an output set of two or more three-dimensional volumes.

2. An apparatus according to claim 1, wherein the instructions, when executed by the one or more processors, cause the apparatus to perform:
    identifying one or more faces and/or edges of the first three-dimensional volume that is or are coincident with or adjacent to the deepest concavity; and
    forming one or more candidate splitting planes or candidate splitting intersection loops from at least one of the identified faces and edges.

3. An apparatus according to claim 2, wherein the instructions, when executed by the one or more processors, cause the apparatus to perform: scoring each of multiple candidate splitting planes or candidate splitting intersection loops and selecting as the splitting plane or the splitting intersection loop a candidate splitting plane or candidate splitting intersection loop that has a best score.

4. An apparatus according to claim 3, wherein the instructions, when executed by the one or more processors, cause the apparatus to perform: scoring each of multiple candidate splitting planes or candidate splitting intersection loops by summing volumes of convex hulls of volumes that are produced by splitting the first three-dimensional volume along the candidate splitting plane or candidate splitting intersection loop.

5. An apparatus according to claim 1, wherein the instructions, when executed by the one or more processors, cause the apparatus to perform: calculating an overhang metric which indicates the non-convexity of the first volume, and selecting, using the overhang metric, the first three-dimensional volume from among the input set of one or more three-dimensional volumes.

6. An apparatus according to claim 5, wherein the instructions, when executed by the one or more processors, cause the apparatus to perform: selecting the first three-dimensional volume by selecting the three-dimensional volume from among the input set of one or more three-dimensional volumes for which a greatest magnitude overhang metric value was calculated.

7. An apparatus according to claim 5, wherein the instructions, when executed by the one or more processors, cause the apparatus to perform calculating the overhang metric by calculating a maximum distance by which an approximating convex volume of the first three-dimensional volume extends from the first three-dimensional volume.

8. An apparatus according to claim 5, wherein the instructions, when executed by the one or more processors, cause the apparatus to perform: voxelizing the input set of one or more three-dimensional volumes such as to provide a voxel representation of the input set of one or more three-dimensional volumes, and wherein calculating the overhang metric comprises:
    identifying voxels of the voxel representation of the input set of volumes which are outside the one or more three-dimensional volumes and within an approximating convex volume of the first three-dimensional volume;
    for each voxel which was determined to lie outside the one or more three-dimensional volumes and within the approximating convex volume of the first three-dimensional volume:
        calculating a minimum distance from the voxel to a surface of the approximating convex volume, and
        calculating a minimum distance from the voxel to a surface of the first three-dimensional volume,
        summing the two distances to obtain a generalized overhang metric for the voxel, and
    identifying the highest magnitude generalized overhang metric.

9. An apparatus according to claim 1, wherein the instructions, when executed by the one or more processors, cause the apparatus to perform: voxelizing the input set of one or more three-dimensional volumes such as to provide a voxel representation of the input set of one or more three-dimensional volumes, and using the voxel representation to identify the deepest concavity in the first three-dimensional volume.

10. An apparatus according to claim 1, wherein the instructions, when executed by the one or more processors, cause the apparatus to perform: merging two or more three-dimensional volumes from the input set of one or more three-dimensional volumes such as to provide a merged three-dimensional volume, wherein the one or more three-dimensional volumes are at least two three-dimensional volumes.

11. An apparatus according to claim 10, wherein the instructions, when executed by the one or more processors, cause the apparatus to perform: providing the merged three-dimensional volume in the output set of two or more three-dimensional volumes.

12. An apparatus according to claim 10, wherein the instructions, when executed by the one or more processors, cause the apparatus to perform:
    providing the merged three-dimensional volume in an intermediate set of three or more three-dimensional volumes;

merging two or more three-dimensional volumes of the intermediate set of three-dimensional volumes to provide a merged three-dimensional volume; and providing the merged three-dimensional volume in the output set of two or more three-dimensional volumes.

13. An apparatus according to claim 1, wherein the instructions, when executed by the one or more processors, cause the apparatus to perform: iteratively splitting three-dimensional volumes from the input set of one or more three-dimensional volumes to provide an intermediate set of three or more three-dimensional volumes, and then iteratively merging volumes of the intermediate set of three or more three-dimensional volumes to provide the output set of two or more three-dimensional volumes.

14. A non-transitory computer readable storage medium having instructions that, when executed by a processing device, cause the processing device to perform operations comprising:

obtaining data representing an input set of one or more three-dimensional volumes;

selecting a first three-dimensional volume from among the input set of one or more three-dimensional volumes;

identifying points which are outside or on a surface of the one or more three-dimensional volumes;

calculating a depth value for each of multiple points which was determined to lie outside or on the surface of the one or more three-dimensional volumes, the depth value for a point indicating the length of the shortest non-straight path to that point from a point outside the approximating convex volume, where the path remains outside the one or more volumes; and using the depth values to identify a region of deepest concavity in the first three-dimensional volume;

splitting the first three-dimensional volume along a split plane or intersection loop contacting or intersecting the region of deepest concavity, such as to provide plural three-dimensional volumes; and providing data representing an output set of two or more three-dimensional volumes.

15. An apparatus according to claim 1, wherein the data representing an input set of one or more three-dimensional volumes and the data representing an output set of two or more three-dimensional volumes are mesh data.

16. A non-transitory computer readable storage medium according to claim 15, wherein the instructions, when executed, cause the processing device to perform:

identifying one or more faces and/or edges of the first three-dimensional volume that is or are coincident with or adjacent to the deepest concavity; and forming one or more candidate splitting planes or candidate splitting intersection loops from at least one of the identified faces and edges.

17. A non-transitory computer readable storage medium according to claim 16, wherein the instructions, when executed, cause the processing device to perform:

scoring each of multiple candidate splitting planes or candidate splitting intersection loops and selecting as the splitting plane or the splitting intersection loop a candidate splitting plane or candidate splitting intersection loop that has a best score.

18. A non-transitory computer readable storage medium according to claim 17, wherein the instructions, when executed, cause the processing device to perform:

scoring each of multiple candidate splitting planes or candidate splitting intersection loops by summing volumes of convex hulls of volumes that are produced by splitting the first three-dimensional volume along the candidate splitting plane or candidate splitting intersection loop.

19. A non-transitory computer readable storage medium according to claim 14, wherein the instructions, when executed, cause the processing device to perform:

calculating an overhang metric which indicates the non-convexity of the first volume, and selecting, using the overhang metric, the first three-dimensional volume from among the input set of three-dimensional volumes.

20. A computer implemented method comprising:

obtaining data representing an input set of one or more three-dimensional volumes;

selecting a first three-dimensional volume from among the input set of one or more three-dimensional volumes;

identifying points which are outside or on a surface of the one or more three-dimensional volumes;

calculating a depth value for each of multiple points which was determined to lie outside or on the surface of the one or more three-dimensional volumes, the depth value for a point indicating the length of the shortest non-straight path to that point from a point outside the approximating convex volume, where the path remains outside the one or more volumes; and using the depth values to identify a region of deepest concavity in the first three-dimensional volume;

splitting the first three-dimensional volume along a split plane or intersection loop contacting or intersecting the region of deepest concavity, such as to provide plural three-dimensional volumes; and providing data representing an output set of two or more three-dimensional volumes.

* * * * *

UNITED STATES PATENT AND TRADEMARK OFFICE
CERTIFICATE OF CORRECTION

PATENT NO. : 10,846,910 B2  
APPLICATION NO. : 16/380535  
DATED : November 24, 2020  
INVENTOR(S) : Ashton Mason Page 1 of 1

It is certified that error appears in the above-identified patent and that said Letters Patent is hereby corrected as shown below:

In the Specification

In Column 20, Line 42, delete "too," and insert -- 100, --, therefor.

In Column 21, Line 51, delete "low." and insert -- 101c. --, therefor.

In Column 21, Line 53, delete "low" and insert -- 101c --, therefor.

In Column 30, Line 16, delete "S1520," and insert -- S1510, --, therefor.

Signed and Sealed this  
Twelfth Day of January, 2021

Andrei Iancu  
*Director of the United States Patent and Trademark Office*